(12) United States Patent
Schwarm

(10) Patent No.: US 7,333,871 B2
(45) Date of Patent: Feb. 19, 2008

(54) AUTOMATED DESIGN AND EXECUTION OF EXPERIMENTS WITH INTEGRATED MODEL CREATION FOR SEMICONDUCTOR MANUFACTURING TOOLS

(75) Inventor: Alexander T. Schwarm, Austin, TX (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 10/759,108

(22) Filed: Jan. 20, 2004

(65) Prior Publication Data

US 2004/0148049 A1 Jul. 29, 2004

Related U.S. Application Data

(60) Provisional application No. 60/441,147, filed on Jan. 21, 2003.

(51) Int. Cl.
*G06F 19/00* (2006.01)

(52) U.S. Cl. .................. 700/108; 700/97; 700/121

(58) Field of Classification Search ............ 700/29, 700/31, 108, 109, 97, 121; 703/2
See application file for complete search history.

(56) References Cited

U.S. PATENT DOCUMENTS

| | | |
|---|---|---|
| 3,205,485 A | 9/1965 | Noltingk |
| 3,229,198 A | 1/1966 | Libby |
| 3,767,900 A | 10/1973 | Chao et al. |
| 3,920,965 A | 11/1975 | Sohrwardy |
| 4,000,458 A | 12/1976 | Miller et al. |
| 4,207,520 A | 6/1980 | Flora et al. |
| 4,209,744 A | 6/1980 | Gerasimov et al. |
| 4,302,721 A | 11/1981 | Urbanek et al. |
| 4,368,510 A | 1/1983 | Anderson |
| 4,609,870 A | 9/1986 | Lale et al. |
| 4,616,308 A | 10/1986 | Morshedi et al. |
| 4,663,703 A | 5/1987 | Axelby et al. |
| 4,698,766 A | 10/1987 | Entwistle et al. |
| 4,750,141 A | 6/1988 | Judell et al. |
| 4,755,753 A | 7/1988 | Chern |
| 4,757,259 A | 7/1988 | Charpentier |
| 4,796,194 A | 1/1989 | Atherton |

(Continued)

FOREIGN PATENT DOCUMENTS

CA 2050247 8/1991

(Continued)

OTHER PUBLICATIONS

Tan, L., Cameron, D., and C. McCorkell. "Steady-State Regression Analysis and Optimization of Multivariable Plasma Etching System". IEEE (1994): 1986-1991.*

(Continued)

*Primary Examiner*—Ryan A. Jarrett
(74) *Attorney, Agent, or Firm*—Wilmer Hale

(57) ABSTRACT

A method, system and medium of automation performed on a semiconductor manufacturing tool. The method creates a designed set of experiments for the tool and runs the created set of experiments. The method also collects data resulting from running the experiments and creates a model based on the collected data. The created model is used in automatically controlling the tool.

34 Claims, 16 Drawing Sheets

U.S. PATENT DOCUMENTS

| | | |
|---|---|---|
| 4,901,218 A | 2/1990 | Cornwell |
| 4,938,600 A | 7/1990 | Into |
| 4,957,605 A | 9/1990 | Hurwitt et al. |
| 4,967,381 A | 10/1990 | Lane et al. |
| 5,089,970 A | 2/1992 | Lee et al. |
| 5,108,570 A | 4/1992 | Wang |
| 5,208,765 A | 5/1993 | Turnbull |
| 5,220,517 A | 6/1993 | Sierk et al. |
| 5,226,118 A | 7/1993 | Baker et al. |
| 5,231,585 A | 7/1993 | Kobayashi et al. |
| 5,236,868 A | 8/1993 | Nulman |
| 5,240,552 A | 8/1993 | Yu et al. |
| 5,260,868 A | 11/1993 | Gupta et al. |
| 5,270,222 A | 12/1993 | Moslehi |
| 5,283,141 A | 2/1994 | Yoon et al. |
| 5,295,242 A | 3/1994 | Mashruwala et al. |
| 5,309,221 A | 5/1994 | Fischer et al. |
| 5,329,463 A | 7/1994 | Sierk et al. |
| 5,338,630 A | 8/1994 | Yoon et al. |
| 5,347,446 A | 9/1994 | Iino et al. |
| 5,367,624 A | 11/1994 | Cooper |
| 5,369,544 A | 11/1994 | Mastrangelo |
| 5,375,064 A | 12/1994 | Bollinger |
| 5,398,336 A | 3/1995 | Tantry et al. |
| 5,402,367 A | 3/1995 | Sullivan et al. |
| 5,408,405 A * | 4/1995 | Mozumder et al. ............ 700/31 |
| 5,410,473 A | 4/1995 | Kaneko et al. |
| 5,420,796 A | 5/1995 | Weling et al. |
| 5,427,878 A | 6/1995 | Corliss |
| 5,444,837 A | 8/1995 | Bomans et al. |
| 5,469,361 A | 11/1995 | Moyne |
| 5,485,082 A | 1/1996 | Wisspeintner et al. |
| 5,490,097 A | 2/1996 | Swenson et al. |
| 5,495,417 A | 2/1996 | Fuduka et al. |
| 5,497,316 A | 3/1996 | Sierk et al. |
| 5,497,381 A | 3/1996 | O'Donoghue et al. |
| 5,503,707 A | 4/1996 | Maung et al. |
| 5,508,947 A | 4/1996 | Sierk et al. |
| 5,511,005 A | 4/1996 | Abbe et al. |
| 5,519,605 A | 5/1996 | Cawlfield |
| 5,525,808 A | 6/1996 | Irie et al. |
| 5,526,293 A | 6/1996 | Mozumder et al. |
| 5,534,289 A | 7/1996 | Bilder et al. |
| 5,541,510 A | 7/1996 | Danielson |
| 5,546,312 A | 8/1996 | Mozumder et al. |
| 5,553,195 A | 9/1996 | Meijer |
| 5,586,039 A | 12/1996 | Hirsch et al. |
| 5,599,423 A | 2/1997 | Parker et al. |
| 5,602,492 A | 2/1997 | Cresswell et al. |
| 5,603,707 A | 2/1997 | Trombetta et al. |
| 5,617,023 A | 4/1997 | Skalski |
| 5,627,083 A | 5/1997 | Tounai |
| 5,629,216 A | 5/1997 | Wijaranakula et al. |
| 5,642,296 A | 6/1997 | Saxena |
| 5,646,870 A | 7/1997 | Krivokapic et al. |
| 5,649,169 A | 7/1997 | Berezin et al. |
| 5,654,903 A | 8/1997 | Reitman et al. |
| 5,655,951 A | 8/1997 | Meikle et al. |
| 5,657,254 A | 8/1997 | Sierk et al. |
| 5,661,669 A | 8/1997 | Mozumder et al. |
| 5,663,797 A | 9/1997 | Sandhu |
| 5,664,987 A | 9/1997 | Renteln |
| 5,665,199 A | 9/1997 | Sahota et al. |
| 5,665,214 A | 9/1997 | Iturralde |
| 5,666,297 A | 9/1997 | Britt et al. |
| 5,667,424 A | 9/1997 | Pan |
| 5,674,787 A | 10/1997 | Zhao et al. |
| 5,694,325 A | 12/1997 | Fukuda et al. |
| 5,695,810 A | 12/1997 | Dubin et al. |
| 5,698,989 A | 12/1997 | Nulman |
| 5,719,495 A | 2/1998 | Moslehi |
| 5,719,796 A | 2/1998 | Chen |
| 5,735,055 A | 4/1998 | Hochbein et al. |
| 5,740,429 A | 4/1998 | Wang et al. |
| 5,751,582 A | 5/1998 | Saxena et al. |
| 5,754,297 A | 5/1998 | Nulman |
| 5,761,064 A | 6/1998 | La et al. |
| 5,761,065 A | 6/1998 | Kittler et al. |
| 5,764,543 A | 6/1998 | Kennedy |
| 5,777,901 A | 7/1998 | Berezin et al. |
| 5,787,021 A | 7/1998 | Samaha |
| 5,787,269 A | 7/1998 | Hyodo |
| 5,808,303 A | 9/1998 | Schlagheck et al. |
| 5,812,407 A | 9/1998 | Sato et al. |
| 5,823,854 A | 10/1998 | Chen |
| 5,824,599 A | 10/1998 | Schacham-Diamand et al. |
| 5,825,356 A | 10/1998 | Habib et al. |
| 5,825,913 A | 10/1998 | Rostami et al. |
| 5,828,778 A | 10/1998 | Hagi et al. |
| 5,831,851 A | 11/1998 | Eastburn et al. |
| 5,832,224 A | 11/1998 | Fehskens et al. |
| 5,838,595 A | 11/1998 | Sullivan et al. |
| 5,838,951 A | 11/1998 | Song |
| 5,844,554 A | 12/1998 | Geller et al. |
| 5,857,258 A | 1/1999 | Penzes et al. |
| 5,859,777 A | 1/1999 | Yokoyama et al. |
| 5,859,964 A | 1/1999 | Wang et al. |
| 5,859,975 A | 1/1999 | Brewer et al. |
| 5,862,054 A | 1/1999 | Li |
| 5,863,807 A | 1/1999 | Jang et al. |
| 5,867,389 A | 2/1999 | Hamada et al. |
| 5,870,306 A | 2/1999 | Harada |
| 5,871,805 A | 2/1999 | Lemelson |
| 5,883,437 A | 3/1999 | Maruyama et al. |
| 5,889,991 A | 3/1999 | Consolatti et al. |
| 5,901,313 A | 5/1999 | Wolf et al. |
| 5,903,455 A | 5/1999 | Sharpe, Jr. et al. |
| 5,910,011 A | 6/1999 | Cruse |
| 5,910,846 A | 6/1999 | Sandhu |
| 5,912,678 A | 6/1999 | Saxena et al. |
| 5,916,016 A | 6/1999 | Bothra |
| 5,923,553 A | 7/1999 | Yi |
| 5,926,690 A | 7/1999 | Toprac et al. |
| 5,930,138 A | 7/1999 | Lin et al. |
| 5,940,300 A | 8/1999 | Ozaki |
| 5,943,237 A | 8/1999 | Van Boxem |
| 5,943,550 A | 8/1999 | Fulford, Jr. et al. |
| 5,960,185 A | 9/1999 | Nguyen |
| 5,960,214 A | 9/1999 | Sharpe, Jr. et al. |
| 5,961,369 A | 10/1999 | Bartels et al. |
| 5,963,881 A | 10/1999 | Kahn et al. |
| 5,975,994 A | 11/1999 | Sandhu et al. |
| 5,978,751 A | 11/1999 | Pence et al. |
| 5,982,920 A | 11/1999 | Tobin, Jr. et al. |
| 6,002,989 A | 12/1999 | Shiba et al. |
| 6,012,048 A | 1/2000 | Gustin et al. |
| 6,017,771 A | 1/2000 | Yang et al. |
| 6,036,349 A | 3/2000 | Gombar |
| 6,037,664 A | 3/2000 | Zhao et al. |
| 6,041,263 A | 3/2000 | Boston et al. |
| 6,041,270 A | 3/2000 | Steffan et al. |
| 6,054,379 A | 4/2000 | Yau et al. |
| 6,059,636 A | 5/2000 | Inaba et al. |
| 6,064,759 A | 5/2000 | Buckley et al. |
| 6,072,313 A | 6/2000 | Li et al. |
| 6,074,443 A | 6/2000 | Venkatesh et al. |
| 6,077,412 A | 6/2000 | Ting et al. |
| 6,078,845 A | 6/2000 | Friedman |
| 6,094,688 A | 7/2000 | Mellen-Garnett et al. |
| 6,096,649 A | 8/2000 | Jang |
| 6,097,887 A | 8/2000 | Hardikar et al. |
| 6,100,195 A | 8/2000 | Chan et al. |
| 6,108,092 A | 8/2000 | Sandhu |
| 6,111,634 A | 8/2000 | Pecen et al. |

| | | | | | | |
|---|---|---|---|---|---|---|
| 6,112,130 | A | 8/2000 | Fukuda et al. | 6,336,841 B1 | 1/2002 | Chang |
| 6,113,462 | A | 9/2000 | Yang | 6,339,727 B1 | 1/2002 | Ladd |
| 6,114,238 | A | 9/2000 | Liao | 6,340,602 B1 | 1/2002 | Johnson et al. |
| 6,127,263 | A | 10/2000 | Parikh | 6,345,288 B1 | 2/2002 | Reed et al. |
| 6,128,016 | A | 10/2000 | Coelho et al. | 6,345,315 B1 | 2/2002 | Mishra |
| 6,136,163 | A | 10/2000 | Cheung et al. | 6,346,426 B1 | 2/2002 | Toprac et al. |
| 6,141,660 | A | 10/2000 | Bach et al. | 6,355,559 B1 | 3/2002 | Havemann et al. |
| 6,143,646 | A | 11/2000 | Wetzel | 6,360,133 B1 | 3/2002 | Campbell et al. |
| 6,148,099 | A | 11/2000 | Lee et al. | 6,360,184 B1 | 3/2002 | Jacquez |
| 6,148,239 | A | 11/2000 | Funk et al. | 6,363,294 B1 | 3/2002 | Coronel et al. |
| 6,148,246 | A | 11/2000 | Kawazome | 6,366,934 B1 | 4/2002 | Cheng et al. |
| 6,150,270 | A | 11/2000 | Matsuda et al. | 6,368,879 B1 | 4/2002 | Toprac |
| 6,157,864 | A | 12/2000 | Schwenke et al. | 6,368,883 B1 | 4/2002 | Bode et al. |
| 6,159,075 | A | 12/2000 | Zhang | 6,368,884 B1 | 4/2002 | Goodwin et al. |
| 6,159,644 | A | 12/2000 | Satoh et al. | 6,379,980 B1 | 4/2002 | Toprac |
| 6,161,054 | A | 12/2000 | Rosenthal et al. | 6,381,564 B1 * | 4/2002 | Davis et al. .................. 703/22 |
| 6,169,931 | B1 | 1/2001 | Runnels | 6,388,253 B1 | 5/2002 | Su |
| 6,172,756 | B1 | 1/2001 | Chalmers et al. | 6,389,491 B1 | 5/2002 | Jacobson et al. |
| 6,173,240 | B1 | 1/2001 | Sepulveda et al. | 6,391,780 B1 | 5/2002 | Shih et al. |
| 6,175,777 | B1 | 1/2001 | Kim | 6,395,152 B1 | 5/2002 | Wang |
| 6,178,390 | B1 | 1/2001 | Jun | 6,397,114 B1 | 5/2002 | Eryurek et al. |
| 6,181,013 | B1 | 1/2001 | Liu et al. | 6,400,162 B1 | 6/2002 | Mallory et al. |
| 6,183,345 | B1 | 2/2001 | Kamono et al. | 6,405,096 B1 | 6/2002 | Toprac et al. |
| 6,185,324 | B1 | 2/2001 | Ishihara et al. | 6,405,144 B1 | 6/2002 | Toprac et al. |
| 6,191,864 | B1 | 2/2001 | Sandhu | 6,417,014 B1 | 7/2002 | Lam et al. |
| 6,192,291 | B1 | 2/2001 | Kwon | 6,427,093 B1 | 7/2002 | Toprac |
| 6,197,604 | B1 | 3/2001 | Miller et al. | 6,432,728 B1 | 8/2002 | Tai et al. |
| 6,204,165 | B1 | 3/2001 | Ghoshal | 6,435,952 B1 | 8/2002 | Boyd et al. |
| 6,210,983 | B1 | 4/2001 | Atchison et al. | 6,438,438 B1 | 8/2002 | Takagi et al. |
| 6,211,094 | B1 | 4/2001 | Jun et al. | 6,440,295 B1 | 8/2002 | Wang |
| 6,212,961 | B1 | 4/2001 | Dvir | 6,442,496 B1 | 8/2002 | Pasadyn et al. |
| 6,214,734 | B1 | 4/2001 | Bothra et al. | 6,449,524 B1 | 9/2002 | Miller et al. |
| 6,217,412 | B1 | 4/2001 | Campbell et al. | 6,455,415 B1 | 9/2002 | Lopatin et al. |
| 6,219,711 | B1 | 4/2001 | Chari | 6,455,937 B1 | 9/2002 | Cunningham |
| 6,222,936 | B1 | 4/2001 | Phan et al. | 6,465,263 B1 | 10/2002 | Coss, Jr. et al. |
| 6,226,563 | B1 | 5/2001 | Lim | 6,470,230 B1 | 10/2002 | Toprac et al. |
| 6,226,792 | B1 | 5/2001 | Goiffon et al. | 6,479,902 B1 | 11/2002 | Lopatin et al. |
| 6,228,280 | B1 | 5/2001 | Li et al. | 6,479,990 B2 | 11/2002 | Mednikov et al. |
| 6,230,069 | B1 | 5/2001 | Campbell et al. | 6,482,660 B2 | 11/2002 | Conchieri et al. |
| 6,236,903 | B1 | 5/2001 | Kim et al. | 6,484,064 B1 | 11/2002 | Campbell |
| 6,237,050 | B1 | 5/2001 | Kim et al. | 6,486,492 B1 | 11/2002 | Su |
| 6,240,330 | B1 | 5/2001 | Kurtzberg et al. | 6,492,281 B1 | 12/2002 | Song et al. |
| 6,240,331 | B1 | 5/2001 | Yun | 6,495,452 B1 | 12/2002 | Shih |
| 6,245,581 | B1 | 6/2001 | Bonser et al. | 6,503,839 B2 | 1/2003 | Gonzales et al. |
| 6,246,972 | B1 | 6/2001 | Klimasauskas | 6,514,861 B1 * | 2/2003 | Yang et al. .................. 438/690 |
| 6,248,602 | B1 | 6/2001 | Bode et al. | 6,515,368 B1 | 2/2003 | Lopatin et al. |
| 6,249,712 | B1 | 6/2001 | Boiquaye | 6,517,413 B1 | 2/2003 | Hu et al. |
| 6,252,412 | B1 | 6/2001 | Talbot et al. | 6,517,414 B1 | 2/2003 | Tobin et al. |
| 6,253,366 | B1 | 6/2001 | Mutschler, III | 6,528,409 B1 | 3/2003 | Lopatin et al. |
| 6,259,160 | B1 | 7/2001 | Lopatin et al. | 6,529,789 B1 | 3/2003 | Campbell et al. |
| 6,263,255 | B1 | 7/2001 | Tan et al. | 6,532,555 B1 | 3/2003 | Miller et al. |
| 6,268,270 | B1 | 7/2001 | Scheid et al. | 6,535,783 B1 | 3/2003 | Miller et al. |
| 6,271,670 | B1 | 8/2001 | Caffey | 6,537,912 B1 | 3/2003 | Agarwal |
| 6,276,989 | B1 | 8/2001 | Campbell et al. | 6,540,591 B1 | 4/2003 | Pasadyn et al. |
| 6,277,014 | B1 | 8/2001 | Chen et al. | 6,541,401 B1 | 4/2003 | Herner et al. |
| 6,278,899 | B1 | 8/2001 | Piche et al. | 6,546,508 B1 | 4/2003 | Sonderman et al. |
| 6,280,289 | B1 | 8/2001 | Wiswesser et al. | 6,556,881 B1 | 4/2003 | Miller |
| 6,281,127 | B1 | 8/2001 | Shue | 6,560,504 B1 | 5/2003 | Goodwin et al. |
| 6,284,622 | B1 | 9/2001 | Campbell et al. | 6,563,308 B2 | 5/2003 | Nagano et al. |
| 6,287,879 | B1 | 9/2001 | Gonzales et al. | 6,567,717 B2 | 5/2003 | Krivokapic et al. |
| 6,290,572 | B1 | 9/2001 | Hofmann | 6,580,958 B1 | 6/2003 | Takano |
| 6,291,367 | B1 | 9/2001 | Kelkar | 6,587,744 B1 | 7/2003 | Stoddard et al. |
| 6,292,708 | B1 | 9/2001 | Allen et al. | 6,590,179 B2 | 7/2003 | Tanaka et al. |
| 6,298,274 | B1 | 10/2001 | Inoue | 6,604,012 B1 | 8/2003 | Cho et al. |
| 6,298,470 | B1 | 10/2001 | Breiner et al. | 6,605,549 B2 | 8/2003 | Leu et al. |
| 6,303,395 | B1 | 10/2001 | Nulman | 6,607,976 B2 | 8/2003 | Chen et al. |
| 6,304,999 | B1 | 10/2001 | Toprac et al. | 6,609,946 B1 | 8/2003 | Tran |
| 6,307,628 | B1 | 10/2001 | Lu et al. | 6,616,513 B1 | 9/2003 | Osterheld |
| 6,314,379 | B1 | 11/2001 | Hu et al. | 6,618,692 B2 | 9/2003 | Takahashi et al. |
| 6,317,643 | B1 | 11/2001 | Dmochowski | 6,624,075 B1 | 9/2003 | Lopatin et al. |
| 6,320,655 | B1 | 11/2001 | Matsushita et al. | 6,625,497 B2 | 9/2003 | Fairbairn et al. |
| 6,324,481 | B1 | 11/2001 | Atchison et al. | 6,630,741 B1 | 10/2003 | Lopatin et al. |
| 6,334,807 | B1 * | 1/2002 | Lebel et al. ................... 451/6 | 6,640,151 B1 | 10/2003 | Somekh et al. |

| | | | | | | |
|---|---|---|---|---|---|---|
| 6,652,355 | B2 | 11/2003 | Wiswesser et al. | JP | 05-151231 | 6/1993 |
| 6,660,633 | B1 | 12/2003 | Lopatin et al. | JP | 05-216896 | 8/1993 |
| 6,678,570 | B1 | 1/2004 | Pasadyn et al. | JP | 05-266029 | 10/1993 |
| 6,708,074 | B1 | 3/2004 | Chi et al. | JP | 06-110894 | 4/1994 |
| 6,708,075 | B2 | 3/2004 | Sonderman et al. | JP | 06-176994 | 6/1994 |
| 6,725,402 | B1 | 4/2004 | Coss, Jr. et al. | JP | 06-184434 | 7/1994 |
| 6,728,587 | B2 | 4/2004 | Goldman et al. | JP | 06-252236 | 9/1994 |
| 6,735,492 | B2 | 5/2004 | Conrad et al. | JP | 06-260380 | 9/1994 |
| 6,751,518 | B1 | 6/2004 | Sonderman et al. | JP | 07-006939 | 1/1995 |
| 6,774,998 | B1 | 8/2004 | Wright et al. | JP | 8-23166 | 1/1996 |
| 2001/0001755 | A1 | 5/2001 | Sandhu et al. | JP | 08-50161 | 2/1996 |
| 2001/0003084 | A1 | 6/2001 | Finarov | JP | 08-149583 | 6/1996 |
| 2001/0006873 | A1 | 7/2001 | Moore | JP | 08-304023 | 11/1996 |
| 2001/0030366 | A1 | 10/2001 | Nakano et al. | JP | 09-34535 | 2/1997 |
| 2001/0039462 | A1 | 11/2001 | Mendez et al. | JP | 9-246547 | 9/1997 |
| 2001/0040997 | A1 | 11/2001 | Tsap et al. | JP | 10-34522 | 2/1998 |
| 2001/0042690 | A1 | 11/2001 | Talieh | JP | 10-173029 | 6/1998 |
| 2001/0044667 | A1 | 11/2001 | Nakano et al. | JP | 11-67853 | 3/1999 |
| 2002/0032499 | A1 | 3/2002 | Wilson et al. | JP | 11-126816 | 5/1999 |
| 2002/0058460 | A1 | 5/2002 | Lee et al. | JP | 11-135601 | 5/1999 |
| 2002/0070126 | A1 | 6/2002 | Sato et al. | JP | 2000-183001 | 6/2000 |
| 2002/0077031 | A1 | 6/2002 | Johannson et al. | JP | 2001-76982 | 3/2001 |
| 2002/0081951 | A1 | 6/2002 | Boyd et al. | JP | 2001-284299 | 10/2001 |
| 2002/0089676 | A1 | 7/2002 | Pecen et al. | JP | 2001-305108 | 10/2001 |
| 2002/0102853 | A1 | 8/2002 | Li et al. | JP | 2002-9030 | 1/2002 |
| 2002/0107599 | A1 | 8/2002 | Patel et al. | JP | 2002-343754 | 11/2002 |
| 2002/0107604 | A1 | 8/2002 | Riley et al. | TW | 434103 | 5/2001 |
| 2002/0113039 | A1 | 8/2002 | Mok et al. | TW | 436383 B | 5/2001 |
| 2002/0127950 | A1 | 9/2002 | Hirose et al. | TW | 455938 B | 9/2001 |
| 2002/0128805 | A1* | 9/2002 | Goldman et al. ............... 703/2 | TW | 455976 | 9/2001 |
| 2002/0149359 | A1 | 10/2002 | Crouzen et al. | WO | WO 95/34866 | 12/1995 |
| 2002/0165636 | A1 | 11/2002 | Hasan | WO | WO 98/05066 | 2/1998 |
| 2002/0183986 | A1* | 12/2002 | Stewart et al. ................. 703/2 | WO | WO 98/45090 | 10/1998 |
| 2002/0185658 | A1 | 12/2002 | Inoue et al. | WO | WO 99/09371 | 2/1999 |
| 2002/0193899 | A1 | 12/2002 | Shanmugasundram et al. | WO | WO 99/25520 | 5/1999 |
| 2002/0193902 | A1 | 12/2002 | Shanmugasundram et al. | WO | WO 99/59200 | 11/1999 |
| 2002/0197745 | A1 | 12/2002 | Shanmugasundram et al. | WO | WO-99/60982 | 12/1999 |
| 2002/0197934 | A1 | 12/2002 | Paik | WO | WO 00/00874 | 1/2000 |
| 2002/0199082 | A1 | 12/2002 | Shanmugasundram et al. | WO | WO 00/05759 | 2/2000 |
| 2003/0017256 | A1 | 1/2003 | Shimane | WO | WO-00/16228 | 3/2000 |
| 2003/0020909 | A1 | 1/2003 | Adams et al. | WO | WO-00/22488 | 4/2000 |
| 2003/0020928 | A1 | 1/2003 | Ritzdorf et al. | WO | WO 00/35063 | 6/2000 |
| 2003/0154062 | A1* | 8/2003 | Daft et al. ...................... 703/5 | WO | WO 00/54325 | 9/2000 |
| | | | | WO | WO 00/79355 A1 | 12/2000 |
| | | FOREIGN PATENT DOCUMENTS | | WO | WO 01/11679 A1 | 2/2001 |
| CA | | 2165847 | 8/1991 | WO | WO 01/15865 A1 | 3/2001 |
| CA | | 2194855 | 8/1991 | WO | WO 01/18623 A1 | 3/2001 |
| EP | | 0 397 924 A1 | 11/1990 | WO | WO 01/25865 A1 | 4/2001 |
| EP | | 0 621 522 A2 | 10/1994 | WO | WO 01/33277 A1 | 5/2001 |
| EP | | 0 747 795 A2 | 12/1996 | WO | WO 01/33501 A1 | 5/2001 |
| EP | | 0 869 652 A2 | 10/1998 | WO | WO 01/52055 A3 | 7/2001 |
| EP | | 0 877 308 A2 | 11/1998 | WO | WO 01/52319 A1 | 7/2001 |
| EP | | 0 881 040 A2 | 12/1998 | WO | WO-01/55926 | 8/2001 |
| EP | | 0 895 145 A1 | 2/1999 | WO | WO 01/57823 A2 | 8/2001 |
| EP | | 0 910 123 A1 | 4/1999 | WO | WO 01/80306 A2 | 10/2001 |
| EP | | 0 932 194 A1 | 7/1999 | WO | WO 02/17150 A1 | 2/2002 |
| EP | | 0 932 195 A1 | 7/1999 | WO | WO 02/31613 A2 | 4/2002 |
| EP | | 1 066 925 A2 | 1/2001 | WO | WO 02/31613 A3 | 4/2002 |
| EP | | 1 067 757 A1 | 1/2001 | WO | WO 02/33737 A2 | 4/2002 |
| EP | | 1 071 128 A2 | 1/2001 | WO | WO 02/074491 A1 | 9/2002 |
| EP | | 1 083 470 A2 | 3/2001 | | | |
| EP | | 1 092 505 A2 | 4/2001 | | | |
| EP | | 1 072 967 A3 | 11/2001 | | OTHER PUBLICATIONS | |
| EP | | 1 182 526 A2 | 2/2002 | | | |
| GB | | 2 347 885 A | 9/2000 | | | |
| GB | | 2 365 215 A | 2/2002 | | | |
| JP | | 61-66104 | 4/1986 | | | |
| JP | | 61-171147 | 8/1986 | | | |
| JP | | 63-168717 | 7/1988 | | | |
| JP | | 01-215551 | 8/1989 | | | |
| JP | | 01-283934 | 11/1989 | | | |
| JP | | 3-202710 | 9/1991 | | | |

OTHER PUBLICATIONS

Boning, Duane et al. "Run by Run Control of Chemical-Mechanical Polishing." *IEEE Trans.* Oct. 1996. vol. 19, No. 4. pp. 307-314.

Moyne, James et al. "A Run-to-Run Control Framework for VLSI Manufacturing." *Microelectronic Processing '93 Conference Proceedings.* Sep. 1993.

Telfeyan, Roland et al. "Demonstration of a Process-Independent Run-to-Run Controller." *187th Meeting of the Electrochemical Society.* May 1995.

Moyne, James et al. "A Process-Independent Run-to-Run Controller and Its Application to Chemical-Mechanical Planarization." *SEMI/IEEE* Adv. Semiconductor Manufacturing Conference. Aug. 15, 1995.

Moyne, James et al. "Adaptive Extensions to be a Multi-Branch Run-to-Run Controller for Plasma Etching." *Journal of Vacuum Science and Technology*. 1995.

Sachs, Emanuel et al. "Process Control System for VLSI Fabrication.".

Chaudhry, Nauman et al. "Active Controller: Utilizing Active Databases for Implementing Multi-Step Control of Semiconductor Manufacturing." *University of Michigan*. pp. 1-24.

Chaudhry, Nauman et al. "Designing Databases with Fuzzy Data and Rules for Application to Discrete Control." *University of Michigan*. pp. 1-21.

Chaudhry, Nauman A. et al. "A Design Methodology for Databases with Uncertain Data." *University of Michigan*. pp. 1-14.

Khan, Kareemullah et al. "Run-to-Run Control of ITO Deposition Process." *University of Michigan*. pp. 1-6.

Moyne, James et al. "Yield Improvement @ Contact Through Run-to-Run Control.".

Kim, Jiyoun et al. "Gradient and Radial Uniformity Control of a CMP Process Utilizing a Pre- and Post-Measurement Strategy." *University of Michigan*.

Nov. 15, 2004. European Office Action for European Patent Application No. 02752701.9.

Dec. 14, 2004. U.S. Notice of Allowance for U.S. Appl. No. 09/928,474.

Sep. 15, 2004. Office Action for U.S. Appl. No. 10/632,107, filed Aug. 1, 2003.

Sep. 29, 2004. Office Action for U.S. Appl. No. 09/363,966, filed Jul. 29, 1999.

Oct. 1, 2004. International Preliminary Examination Report for PCT Serial No. PCT/US03/23964.

Oct. 12, 2004. International Preliminary Examination Report for PCT Serial No. PCT/US02/19061.

Nov. 17, 2004. Written Opinion for PCT Serial No. PCT/US01/27407.

IslamRaja, M. M., C. Chang, J. P. McVittie, M. A. Cappello, and K. C. Saraswat. May/Jun. 1993. "Two Precursor Model for Low-Pressure Chemical Vapor Deposition of Silicon Dioxide from Tetraethylorthosilicate." *J. Vac. Sci. Technol. B*, vol. 11, No. 3, pp. 720-726.

Kim, Eui Jung and William N. Gill. Jul. 1994. "Analytical Model for Chemical Vapor Deposition of $SiO_2$ Films Using Tetraethoxysliane and Ozone" (Abstract). *Journal of Crystal Growth*, vol. 140, Issues 3-4, pp. 315-326.

Guo, R.S, A. Chen, C.L. Tseng, I.K. Fong, A. Yang, C.L. Lee, C.H. Wu, S. Lin, S.J. Huang, Y.C. Lee, S.G. Chang, and M.Y. Lee. Jun. 16-17, 1998. "A Real-Time Equipment Monitoring and Fault Detection System." *Semiconductor Manufacturing Technology Workshop*, pp. 111-121.

Lantz, Mikkel. 1999. "Equipment and APC Integration at AMD with Workstream." *IEEE*, pp. 325-327.

Jul. 15, 2004. Office Action for U.S. Appl. No. 10/172,977, filed Jun. 18, 2002.

Aug. 2, 2004. Office Action for U.S. Appl. No. 10/174,377, filed Jun. 18, 2002.

Aug. 9, 2004. Written Opinion for PCT Serial No. PCT/US02/19063.

Aug. 18, 2004. International Preliminary Examination Report for PCT Serial No. PCT/US02/19116.

Aug. 24, 2004. Office Action for U.S. Appl. No. 10/135,405, filed May 1, 2002.

Aug. 25, 2004. Office Action for U.S. Appl. No. 09/998,384, filed Nov. 30, 2001.

Sep. 9, 2004. Written Opinion for PCT Serial No. PCT/US02/21942.

Sep. 16, 2004. International Preliminary Examination Report for PCT Serial No. PCT/US02/24859.

Sun, S.C. 1998. "CVD and PVD Transition Metal Nitrides as Diffusion Barriers for Cu Metallization." *IEEE*. pp. 243-246.

Tagami, M., A. Furuya, T. Onodera, and Y. Hayashi. 1999. "Layered Ta-nitrides (LTN) Barrier Film by Power Swing Sputtering (PSS) Technique for MOCVD-Cu Damascene Interconnects." *IEEE*. pp. 635-638.

Yamagishi, H., Z. Tokei, G.P. Beyer, R. Donaton, H. Bender, T. Nogami, and K. Maex. 2000. "TEM/SEM Investigation and Electrical Evaluation of a Bottomless I-PVD TA(N) Barrier in Dual Damascene" (Abstract). *Advanced Metallization Conference 2000*. San Diego, CA.

Eisenbraun, Eric, Oscar van der Straten, Yu Zhu, Katharine Dovidenko, and Alain Kaloyeros. 2001. "Atomic Layer Deposition (ALD) of Tantalum-Based Materials for Zero Thickness Copper Barrier Applications" (Abstract). *IEEE*. pp. 207-209.

Smith, S.R., K.E. Elers, T. Jacobs, V. Blaschke, and K. Pfeifer. 2001. "Physical and Electrical Characterization of ALD Tin Used as a Copper Diffusion Barrier in 0.25 mum, Dual Damascene Backend Structures" (Abstract). *Advanced Metallization Conference 2001*. Montreal, Quebec.

Kim, Y.T. and H. Sim. 2002. "Characterisitcs of Pulse Plasma Enhanced Atomic Layer Deposition of Tungsten Nitride Diffusion Barrier for Copper Interconnect" (Abstract). *IEIC Technical Report*. vol. 102, No. 178, pp. 115-118.

Elers, Kai-Erik, Ville Saanila, Pekka J. Soininen, Wei-Min Li, Juhana T. Kostamo, Suvi Haukka, Jyrki Juhanoja, and Wim F.A. Besling. 2002. "Diffusion Barrier Deposition on a Copper Surface by Atomic Layer Deposition" (Abstract). *Advanced Materials*. vol. 14, No. 13-14, pp. 149-153.

Peng, C.H., C.H. Hsieh, C.L. Huang, J.C. Lin, M.H. Tsai, M.W. Lin, C.L. Chang, Winston S. Shue, and M.S. Liang. 2002. "A 90nm Generation Copper Dual Damascene Technology with ALD TaN Barrier." *IEEE*. pp. 603-606.

Van der Straten, O., Y. Zhu, E. Eisenbraun, and A. Kaloyeros. 2002. "Thermal and Electrical Barrier Performance Testing of Ultrathin Atomic Layer Deposition Tantalum-Based Materials for Nanoscale Copper Metallization." *IEEE*. pp. 188-190.

Wu, Z.C., Y.C. Lu, C.C. Chiang, M.C. Chen, B.T. Chen, G.J. Wang, Y.T. Chen, J.L. Huang, S.M. Jang, and M.S. Liang. 2002. "Advanced Metal Barrier Free Cu Damascene Interconnects with PECVD Silicon Carbide Barriers for 90/65-nm BEOL Technology." *IEEE*. pp. 595-598.

Jul. 25, 2003. International Search Report for PCT/US02/24858.

Mar. 30, 2004. Written Opinion for PCT/US02/19062.

Apr. 9, 2004. Written Opinion for PCT/US02/19116.

Apr. 22, 2004. Office Action for U.S. Appl. No. 09/998,372, filed Nov. 30, 2001.

Apr. 28, 2004. Written Opinion for PCT/US02/19117.

Apr. 29, 2004. Written Opinion for PCT/US02/19061.

May 5, 2004. Office Action for U.S. Appl. No. 09/943,955, filed Aug. 31, 2001.

May 5, 2004. International Preliminary Examination Report for PCT/US01/27406.

May 28, 2004. Office Action for U.S. Appl. No. 09/943,383, filed Aug. 31, 2001.

Jun. 3, 2004. Office Action for U.S. Appl. No. 09/928,474, filed Aug. 14, 2001.

Jun. 23, 2004. Office Action for U.S. Appl. No. 10/686,589, filed Oct. 17, 2003.

Jun. 30, 2004. Office Action for U.S. Appl. No. 09/800,980, filed Mar. 8, 2001.

Jul. 12, 2004. Office Action for U.S. Appl. No. 10/173,108, filed Jun. 8, 2002.

U.S. Appl. No. 09/363,966, filed Jul. 29, 1999, Arackaparambil et al., Computer Integrated Manufacturing Techniques.

U.S. Appl. No. 09/469,227, filed Dec. 22, 1999, Somekh et al., Multi-Tool Control System, Method and Medium.

U.S. Appl. No. 09/619,044, filed Jul. 19, 2000, Yuan, System and Method of Exporting or Importing Object Data in a Manufacturing Execution System.

U.S. Appl. No. 09/637,620, filed Aug. 11, 2000, Chi et al., Generic Interface Builder.

U.S. Appl. No. 09/656,031, filed Sep. 6, 2000, Chi et al., Dispatching Component for Associating Manufacturing Facility Service Requestors with Service Providers.

U.S. Appl. No. 09/655,542, filed Sep. 6, 2000, Yuan, System, Method and Medium for Defining Palettes to Transform an Application Program Interface for a Service.

U.S. Appl. No. 09/725,908, filed Nov. 30, 2000, Chi et al., Dynamic Subject Information Generation in Message Services of Distributed Object Systems.

U.S. Appl. No. 09/800,980, filed Mar. 8, 2001, Hawkins et al., Dynamic and Extensible Task Guide.

U.S. Appl. No. 09/811,667, filed Mar. 20, 2001, Yuan et al., Fault Tolerant and Automated Computer Software Workflow.

U.S. Appl. No. 09/927,444, filed Aug. 13, 2001, Ward et al., Dynamic Control of Wafer Processing Paths in Semiconductor Manufacturing Processes.

U.S. Appl. No. 09/928,473, filed Aug. 14, 2001, Koh, Tool Sevices Layer for Providing Tool Service Functions in Conjunction with Tool Functions.

U.S. Appl. No. 09/928,474, filed Aug. 14, 2001, Krishnamurthy et al., Experiment Management System, Method and Medium.

U.S. Appl. No. 09/943,383, filed Aug. 31, 2001, Shanmugasundram et al., In Situ Sensor Based Control of Semiconductor Processing Procedure.

U.S. Appl. No. 09/943,955, filed Aug. 31, 2001, Shanmugasundram et al., Feedback Control of a Chemical Mechanical Polishing Device Providing Manipulation of Removal Rate Profiles.

U.S. Appl. No. 09/998,372, filed Nov. 30, 2001, Paik, Control of Chemical Mechanical Polishing Pad Conditioner Directional Velocity to Improve Pad Life.

U.S. Appl. No. 09/998,384, filed Nov. 30, 2001, Paik, Feedforward and Feedback Control for Conditioning of Chemical Mechanical Polishing Pad.

U.S. Appl. No. 10/084,092, filed Feb. 28, 2002, Arackaparambil et al., Computer Integrated Manufacturing Techniques.

U.S. Appl. No. 10/100,184, filed Mar. 19, 2002, Al-Bayati et al., Method, System and Medium for Controlling Semiconductor Wafer Processes Using Critical Dimension Measurements.

U.S. Appl. No. 10/135,405, filed May 1, 2002, Reiss et al., Integration of Fault Detection with Run-to-Run Control.

U.S. Appl. No. 10/135,451, filed May 1, 2002, Shanmugasundram et al., Dynamic Metrology Schemes and Sampling Schemes for Advanced Process Control in Semiconductor Processing.

U.S. Appl. No. 10/172,977, filed Jun. 18, 2002, Shanmugasundram et al., Method, System and Medium for Process Control for the Matching of Tools, Chambers and/or Other Semiconductor-Related Entities.

U.S. Appl. No. 10/173,108, filed Jun. 18, 2002, Shanmugasundram et al., Integrating Tool, Module, and Fab Level Control.

U.S. Appl. No. 10/174,370, filed Jun. 18, 2002, Shanmugasundram et al., Feedback Control of Plasma-Enhanced Chemical Vapor Deposition Processes.

U.S. Appl. No. 10/174,377, filed Jun. 18, 2002, Schwarm et al., Feedback Control of Sub-Atmospheric Chemical Vapor Deposition Processes.

U.S. Appl. No. 10/377,654, filed Mar. 4, 2003, Kokotov et al., Method, System and Medium for Controlling Manufacturing Process Using Adaptive Models Based on Empirical Data.

U.S. Appl. No. 10/393,531, filed Mar. 21, 2003, Shanmugasundram et al., Copper Wiring Module Control.

U.S. Appl. No. 10/632,107, filed Aug. 1, 2003, Schwarm et al., Method, System, and Medium for Handling Misrepresentative Metrology Data Within an Advanced Process Control System.

U.S. Appl. No. 10/665,165, filed Sep. 18, 2003, Paik, Feedback Control of a Chemical Mechanical Polishing Process for Multi-Layered Films.

U.S. Appl. No. 10/712,273, filed Nov. 14, 2003, Kokotov, Method, System and Medium for Controlling Manufacture Process Having Multivariate Input Parameters.

Miller, G. L., D. A. H. Robinson, and J. D. Wiley. Jul. 1976. "Contactless measurement of semiconductor conductivity by radio frequency-free-carrier power absorption." *Rev. Sci. Instrum.*, vol. 47, No. 7. pp. 799-805.

Ostanin, Yu.Ya. Oct. 1981. "Optimization of Thickness Inspection of Electrically Conductive Single-Layer Coatings with Laid-on Eddy-Current Transducers (Abstract)." *Defektoskopiya*, vol. 17, No. 10, pp. 45-52. Moscow, USSR.

Feb. 1984. "Method and Apparatus of in Situ Measurement and Overlay Error Analysis for Correcting Step and Repeat Lithographic Cameras." *IBM Technical Disclosure Bulletin*, pp. 4855-4859.

Feb. 1984. "Substrate Screening Process." *IBM Technical Disclosure Bulletin*, pp. 4824-4825.

Oct. 1984. "Method to Characterize the Stability of a Step and Repeat Lithographic System." *IBM Technical Disclosure Bulletin*, pp. 2857-2860.

Levine, Martin D. 1985. *Vision in Man and Machine*. New York: McGraw-Hill, Inc. pp. ix-xii, 1-58.

Herrmann, D. 1988. "Temperature Errors and Ways of Elimination for Contactless Measurement of Shaft Vibrations (Abstract)." *Technisches Messen™*, vol. 55, No. 1, pp. 27-30. West Germany.

Lin, Kuang-Kuo and Costas J. Spanos. Nov. 1990. "Statistical Equipment Modeling for VLSI Manufacturing: An Application for LPCVD." *IEEE Transactions on Semiconductor Manufacturing*, v. 3, No. 4, pp. 216-229.

Runyan, W. R., and K. E. Bean. 1990. "Semiconductor Integrated Circuit Processing Technology." p. 48. Reading, Massachusetts: Addison-Wesley Publishing Company.

Chang, Norman H. and Costas J. Spanos. Feb. 1991. "Continuous Equipment Diagnosis Using Evidence Integration: An LPCVD Application." *IEEE Transactions on Semiconductor Manufacturing*, v. 4, No. 1, pp. 43-51.

Larrabee, G. B. May 1991. "The Intelligent Microelectronics Factory of the Future (Abstract)." *IEEE/SEMI International Semiconductor Manufacturing Science Symposium*, pp. 30-34. Burlingame, CA.

Burke, Peter A. Jun. 1991. "Semi-Empirical Modelling of SiO2 Chemical-Mechanical Polishing Planarization." *VMIC Conference, 1991 IEEE*, pp. 379-384. IEEE.

Zorich, Robert. 1991. *Handbook of Quality Integrated Circuit Manufacturing*. pp. 464-498 San Diego, California: Academic Press, Inc.

Rampalli, Prasad, Arakere Ramesh, and Nimish Shah. 1991. *CEPT—A Computer-Aided Manufacturing Application for Managing Equipment Reliability and Availability in the Semiconductor Industry*. New York, New York: IEEE.

May 1992. "Laser Ablation Endpoint Detector." *IBM Technical Disclosure Bulletin*, pp. 333-334.

Spanos, Costas J., Hai-Feng Guo, Alan Miller, and Joanne Levine-Parrill. Nov. 1992. "Real-Time Statistical Process Control Using Tool Data." *IEEE Transactions on Semiconductor Manufacturing*, v. 5, No. 4, pp. 308-318.

Feb. 1993. "Electroless Plating Scheme to Hermetically Seal Copper Features." *IBM Technical Disclosure Bulletin*, pp. 405-406.

Scarr, J. M. and J. K. Zelisse. Apr. 1993. "New Topology for Thickness Monitoring Eddy Current Sensors (Abstract)." *Proceedings of the 36th Annual Technical Conference*, Dallas, Texas.

Hu, Albert, Kevin Nguyen, Steve Wong, Xiuhua Zhang, Emanuel Sachs, and Peter Renteln. 1993. "Concurrent Deployment of Run by Run Controller Using SCC Framework." IEEE/SEMI International Semiconductor Manufacturing Science Symposium. pp. 126-132.

Matsuyama, Akira and Jessi Niou. 1993. "A State-of-the-Art Automation System of an ASIC Wafer Fab in Japan." *IEEE/SEMI International Semiconductor Manufacturing Science Symposium*, pp. 42-47.

Yeh, C. Eugene, John C. Cheng, and Kwan Wong. 1993. "Implementation Challenges of a Feedback Control System for Wafer Fabrication." *IEEE/CHMT International Electronics Manufacturing Technology Symposium*, pp. 438-442.

Kurtzberg, Jerome M. and Menachem Levanoni. Jan. 1994. "ABC: A Better Control for Manufacturing." *IBM Journal of Research and Development*, v. 38, No. 1, pp. 11-30.

Mozumder, Purnendu K. and Gabriel G. Barna. Feb. 1994. "Statistical Feedback Control of a Plasma Etch Process." *IEEE Transactions on Semiconductor Manufacturing*, v. 7, No. 1, pp. 1-11.

Muller-Heinzerling, Thomas, Ulrich Neu, Hans Georg Nurnberg, and Wolfgang May. Mar. 1994. "Recipe-Controlled Operation of Batch Processes with Batch X." *ATP Automatisierungstechnische Praxis*, vol. 36, No. 3, pp. 43-51.

Stoddard, K., P. Crouch, M. Kozicki, and K. Tsakalis. Jun.-Jul. 1994. "Application of Feedforward and Adaptive Feedback Control to Semiconductor Device Manufacturing (Abstract)." *Proceedings of 1994 American Control Conference—ACC '94*, vol. 1, pp. 892-896. Baltimore, Maryland.

Rocha, Joao and Carlos Ramos. Sep. 12, 1994. "Task Planning for Flexible and Agile Manufacturing Systems." *Intelligent Robots and Systems '94. Advanced Robotic Systems and the Real World, IROS '94. Proceedings of the IEEE/RSJ/GI International Conference on Munich, Germany* Sep. 12-16, 1994. New York, New York: IEEE. pp. 105-112.

Schaper, C. D., M. M. Moslehi, K. C. Saraswat, and T. Kailath. Nov. 1994. "Modeling, Identification, and Control of Rapid Thermal Processing Systems (Abstract)." *Journal of the Electrochemical Society*, vol. 141, No. 11, pp. 3200-3209.

Tao, K. M., R. L. Kosut, M. Ekblad, and G. Aral. Dec. 1994. "Feedforward Learning Applied to RTP of Semiconductor Wafers (Abstract)." *Proceedings of the 33rd IEEE Conference on Decision and Control*, vol. 1, pp. 67-72. Lake Buena Vista, Florida.

Hu, Albert, He Du, Steve Wong, Peter Renteln, and Emmanuel Sachs. 1994. "Application of Run by Run Controller to the Chemical-Mechanical Planarization Process." *IEEE/CPMT International Electronics Manufacturing Technology Symposium*, pp. 371-378.

Spanos, C. J., S. Leang, S.-Y. Ma, J. Thomson, B. Bombay, and X. Niu. May 1995. "A Multistep Supervisory Controller for Photolithographic Operations (Abstrct)." *Proceedings of the Symposium on Process Control, Diagnostics, and Modeling in Semiconductor Manufacturing*, pp. 3-17.

Moyne, James, Roland Telfeyan, Arnon Hurwitz, and John Taylor. Aug. 1995. "A Process-Independent Run-to-Run Controller and Its Application to Chemical-Mechanical Planarization." *SEMI/IEEE Advanced Semiconductor Manufacturing Conference and Workshop*. Ann Arbor, Michigan: The University of Michigan, Electrical Engineering & Computer Science Center for Display Technology & Manufacturing.

Zhou, Zhen-Hong and Rafael Reif. Aug. 1995. "Epi-Film Thickness Measurements Using Emission Fourier Transform Infrared Spectroscopy—Part II: Real-Time in Situ Process Monitoring and Control." IEEE Transactions on Semiconductor Manufacturing, vol. 8, No. 3.

Telfeyan, Roland, James Moyne, Nauman Chaudhry, James Pugmire, Scott Shellman, Duane Boning, William Moyne, Arnon Hurwitz, and John Taylor. Oct. 1995. "A Multi-Level Approach to the Control of a Chemical-Mechanical Planarization Process." Minneapolis, Minnesota: 42nd National Symposium of the American Vacuum Society.

Chang, E., B. Stine, T. Maung, R. Divecha, D. Boning, J. Chung, K. Chang, G. Ray, D. Bradbury, O. S. Nakagawa, S. Oh, and D. Bartelink. Dec. 1995. "Using a Statistical Metrology Framework to Identify Systematic and Random Sources of Die- and Wafer-level ILD Thickness Variation in CMP Processes." Washington, D.C.: International Electron Devices Meeting.

Moyne, James R., Nauman Chaudhry, and Roland Telfeyan. 1995. "Adaptive Extensions to a Multi-Branch Run-to-Run Controller for Plasma Etching." *Journal of Vacuum Science and Technology*. Ann Arbor, Michigan: University of Michigan Display Technology Manufacturing Center.

Schmid, Hans Albrecht. 1995. "Creating the Architecture of a Manufacturing Framework by Design Patterns." Austin, Texas: OOPSLA.

Dishon, G., M. Finarov, R. Kipper, J.W. Curry, T. Schraub, D. Trojan, 4th Stambaugh, Y. Li and J. Ben-Jacob. Feb. 1996. "On-Line Integrated Metrology for CMP Processing." Santa Clara, California: VMIC Speciality Conferences, 1st International CMP Planarization Conference.

Leang, Sovarong, Shang-Yi Ma, John Thomson, Bart John Bombay, and Costas J. Spanos. May 1996. "A Control System for Photolithographic Sequences." *IEEE Transactions on Semiconductor Manufacturing*, vol. 9, No. 2.

Smith, Taber, Duane Boning, James Moyne, Arnon Hurwitz, and John Curry. Jun. 1996. "Compensating for CMP Pad Wear Using Run by Run Feedback Control." Santa Clara, California: Proceedings of the Thirteenth International VLSI Multilevel Interconnection Conference. pp. 437-439.

Boning, Duane S., William P. Moyne, Taber H. Smith, James Moyne, Ronald Telfeyan, Arnon Hurwitz, Scott Shellman, and John Taylor. Oct. 1996. "Run by Run Control of Chemical-Mechanical Polishing." *IEEE Transactions on Components, Packaging, and Manufacturing Technology—Part C*, vol. 19, No. 4, pp. 307-314.

Zhe, Ning, J. R. Moyne, T. Smith, D. Boning, E. Del Castillo, Yeh Jinn-Yi, and Hurwitz. Nov. 1996. "A Comparative Analysis of Run-to-Run Control Algorithms in Semiconductor Manufacturing Industry (Abstract)." *IEEE/SEMI 1996 Advanced Semiconductor Manufacturing Conference Workshop*, pp. 375-381.

Yasuda, M., T. Osaka, and M. Ikeda. Dec. 1996. "Feedforward Control of a Vibration Isolation System for Disturbance Suppression (Abstract)." *Proceeding of the 35th IEEE Conference on Decision and Control*, vol. 2, pp. 1229-1233. Kobe, Japan.

Fan, Jr-Min, Ruey-Shan Guo, Shi-Chung Chang, and Kian-Huei Lee. 1996. "Abnormal Trend Detection of Sequence-Disordered Data Using EWMA Method." *IEEE/SEMI Advanced Semiconductor Manufacturing Conference*, pp. 169-174.

SEMI. [1986] 1996. "Standard for Definition and Measurement of Equipment Reliability, Availability, and Maintainability (RAM)." SEMI E10-96.

Smith, Taber and Duane Boning. 1996. "A Self-Tuning EWMA Controller Utilizing Artificial Neural Network Function Approximation Techniques." *IEEE/CPMT International Electronics Manufacturing Technology Symposium*, pp. 355-363.

Guo, Ruey-Shan, Li-Shia Huang, Argon Chen, and Jin-Jung Chen. Oct. 1997. "A Cost-Effective Methodology for a Run-by-Run EWMA Controller." *6th International Symposium on Semiconductor Manufacturing*, pp. 61-64.

Mullins, J. A., W. J. Campbell, and A. D. Stock. Oct. 1997. "An Evaluation of Model Predictive Control in Run-to-Run Processing in Semiconductor Manufacturing (Abstract)." *Proceedings of the SPIE—The International Society for Optical Engineering Conference*, vol. 3213, pp. 182-189.

Reitman, E. A., D. J. Friedman, and E. R. Lory. Nov. 1997. "Pre-Production Results Demonstrating Multiple-System Models for Yield Analysis (Abstract)." *IEEE Transactions on Semiconductor Manufacturing*, vol. 10, No. 4, pp. 469-481.

Durham, Jim and Myriam Roussel. 1997. "A Statistical Method for Correlating In-Line Defectivity to Probe Yield." *IEEE/SEMI Advanced Semiconductor Manufacturing Conference*, pp. 76-77.

Shindo, Wataru, Eric H. Wang, Ram Akella, and Andrzej J. Strojwas. 1997. "Excursion Detection and Source Isolation in Defect Inspection and Classification." *2nd International Workshop on Statistical Metrology*, pp. 90-93.

Van Zant, Peter. 1997. *Microchip Fabrication: A Practical Guide to Semiconductor Processing*. Third Edition, pp. 472-478. New York, New York: McGraw-Hill.

Campbell, W. Jarrett, and Anthony J. Tropac. Feb. 11-12, 1998. "Run-to-Run Control in Microelectronics Manufacturing." Advanced Micro Devises, TWMCC.

Edgar, Thomas F., Stephanie W. Butler, Jarrett Campbell, Carlos Pfeiffer, Chris Bode, Sung Bo Hwang, and K.S. Balakrishnan. May 1998. "Automatic Control in Microelectronics Manufacturing: Practices, Challenges, and Possibilities." Automatica, vol. 36, pp. 1567-1603, 2000.

Moyne, James, and John Curry. Jun. 1998. "A Fully Automated Chemical-Mechanical Planarization Process." Santa Clara, California: VLSI Multilevel Interconnection (V-MIC) Conference.

Jul. 1998. "Active Controller: Utilizing Active Databases for Implementing Multistep Control of Semiconductor Manufacturing (Abstract)." *IEEE Transactions on Components, Packaging and Manufacturing Technology—Part C*, vol. 21, No. 3, pp. 217-224.

SEMI. Jul. 1998. *New Standard: Provisional Specification for CIM Framework Domain Architecture*. Mountain View, California: SEMI Standards. SEMI Draft Doc. 2817.

Consilium. Aug. 1998. *Quality Management Component: QMC™ and QMC-Link™ Overview*. Mountain View, California: Consilium, Inc.

Chemali, Chadi El, James Moyne, Kareemullah Khan, Rock Nadeau, Paul Smith, John Colt, Jonathan Chapple-Sokol, and Tarun Parikh. Nov. 1998. "Multizone Uniformity Control of a CMP Process Utilizing a Pre and Post-Measurement Strategy." Seattle, Washington: SEMETECH Symposium.

Consilium. 1998. *FAB300™*. Mountain View, California: Consilium, Inc.

Fang, S. J., A. Barda, T. Janecko, W. Little, D. Outley, G. Hempel, S. Joshi, B. Morrison, G. B. Shinn, and M. Birang. 1998. "Control of Dielectric Chemical Mechanical Polishing (CMP) Using and Interferometry Based Endpoint Sensor." *International Proceedings of the IEEE Interconnect Technology Conference*, pp. 76-78.

Khan, Kareemullah, Victor Solakhain, Anthony Ricci, Tier Gu, and James Moyne. 1998. "Run-to-Run Control of ITO Deposition Process." Ann Arbor, Michigan.

Ouma, Dennis, Duane Boning, James Chung, Greg Shinn, Leif Olsen, and John Clark. 1998. "An Integrated Characterization and Modeling Methodology for CMP Dielectric Planarization." *Proceedings of the IEEE 1998 International Interconnect Technology Conference*, pp. 67-69.

Suzuki, Junichi and Yoshikazu Yamamoto. 1998. "Toward the Interoperable Software Design Models: Quartet of UML, XML, DOM, and CORBA." Proceedings IEEE International Software Engineering Standards Symposium. pp. 1-10.

Consilium. Jan. 1999. "FAB300™: Consilium's Next Generation MES Solution of Software and Services which Control and Automate Real-Time FAB Operations." www.consilium.com/products/fab300_page.htm#FAB300 Introduction.

Boning, Duane S., Jerry Stefani, and Stephanie W. Butler. Feb. 1999. "Statistical Methods for Semiconductor Manufacturing." *Encyclopedia of Electrical Engineering, J. G. Webster, Ed.*

McIntosh, John. Mar. 1999. "Using CD-SEM Metrology in the Manufacture of Semiconductors (Abstract)." *JOM*, vol. 51, No. 3, pp. 38-39.

Pan, J. Tony, Ping Li, Kapila Wijekoon, Stan Tsai, and Fritz Redeker. May 1999. "Copper CMP Integration and Time Dependent Pattern Effect." *IEEE 1999 International Interconnect Technology Conference*, pp. 164-166.

Klein, Bruce. Jun. 1999. "Application Development: XML Makes Object Models More Useful." Informationweek. pp. 1A-6A.

Baliga, John. Jul. 1999. "Advanced Process Control: Soon to be a Must." Cahners Semiconductor International. www.semiconductor.net/semiconductor/issues/issues/1999/jul99/docs/feature1.asp.

Consilium. Jul. 1999. "Increasing Overall Equipment Effectiveness (OEE) in Fab Manufacturing by Implementing Consilium's Next-Generation Manufacturing Execution System—MES II." Semiconductor Fabtech Edition 10.

Meckl, P. H. and K. Umemoto. Aug. 1999. "Achieving Fast Motions in Semiconductor Manufacturing Machinery (Abstract)." *Proceedings of the 1999 IEEE International Conference on Control Applications*, vol. 1, pp. 725-729. Kohala Coast, HI.

Consilium Corporate Brochure. Oct. 1999. www.consilium.com.

Khan, K., C. EL Chemali, J. Moyne, J. Chapple-Sokol, R. Nadeu, P. Smith, C., and T. Parikh. Oct. 1999. "Yield Improvement at the Contact Process Through Run-to-Run Control (Abstract)." *24th IEEE/CPMT Electronics Manufacturing Technology Symposium*, pp. 258-263.

Moyne, James. Oct. 1999. "Advancements in CMP Process Automation and Control." Hawaii: (Invited paper and presentation to) Third International Symposium on Chemical Mechanical Polishing in IC Device Manufacturing: 196th Meeting of the Electrochemical Society.

Williams, Randy, Dadi Gudmundsson, Kevin Monahan, Raman Nurani, Meryl Stoller and J. George Shanthikumar. Oct. 1999. "Optimized Sample Planning for Wafer Defect Inspection," *Semiconductor Manufacturing Conference Proceedings, 1999 IEEE International Symposium on Santa Clara, CA*. Piscataway, NJ, pp. 43-46.

Consilium. Nov. 1999. *FAB300™ Update*.

Ruegsegger, Steven, Aaron Wagner, James S. Freudenberg, and Dennis S. Grimard. Nov. 1999. "Feedforward Control for Reduced Run-to-Run Variation in Microelectronics Manufacturing." *IEEE Transactions on Semiconductor Manufacturing*, vol. 12, No. 4.

1999. "Contactless Bulk Resistivity/Sheet Resistance Measurement and Mapping Systems." www.Lehighton.com/fabtech1/index.html.

Nov. 1999. "How to Use EWMA to Achieve SPC and EPC Control." *International Symposium on NDT Contribution to the Infrastructure Safety Systems*, Tores, Brazil. <http://www.ndt.net/abstract/ndtiss99/data/35.htm>.

Edgar, T. F., W. J. Campbell, and C. Bode. Dec. 1999. "Model-Based Control in Microelectronics Manufacturing." *Proceedings of the 38th IEEE Conference on Decision and Control*, Phoenix, Arizona, vol. 4, pp. 4185-4191.

Meckl, P. H. and K. Umemoto. Apr. 2000. "Achieving Fast Motions by Using Shaped Reference Inputs [Semiconductor Manufacturing Machine] (Abstract)." *NEC Research and Development*, vol. 41, No. 2, pp. 232-237.

Chemali, Chadi El, James Moyne, Kareemullah Khan, Rock Nadeau, Paul Smith, John Colt, Jonathan Chapple-Sokol, and Tarun Parikh. Jul./Aug. 2000. "Multizone Uniformity Control of a Chemical Mechanical Polishing Process Utilizing a Pre- and Postmeasurement Strategy." J. Vac. Sci. Technol. A, vol. 18(4). pp. 1287-1296. American Vacuum Society.

Oechsner, R., T. Tschaftary, S. Sommer, L. Pfitzner, H. Ryssel, H. Gerath, C. Baier, and M. Hafner. Sep. 2000. "Feed-forward Control for a Lithography/Etch Sequence (Abstract)." *Proceedings of the SPIE—The International Society for Optical Engineering Conference*, vol. 4182, pp. 31-39.

Cheung, Robin. Oct. 18, 2000. "Copper Interconnect Technology." *AVS/CMP User Group Meeting*, Santa Clara, CA.

Edgar, Thomas F., Stephanie W. Butler, W. Jarrett Campbell, Carlos Pfeiffer, Christopher Bode, Sung Bo Hwang, K. S. Balakrishnan, and J. Hahn. Nov. 2000. "Automatic Control in Microelectronics Manufacturing: Practices, Challenges, and Possibilities (Abstract)." *Automatica*, v. 36, No. 11.

Khan, S., M. Musavi, and H. Ressom. Nov. 2000. "Critical Dimension Control in Semiconductor Manufacturing (Abstract)." *ANNIE 2000. Smart Engineering Systems Design Conference*, pp. 995-1000. St. Louis, Missouri.

ACM Research Inc. 2000. "Advanced Copper Metallization for 0.13 to 0.05µm & Beyond." <http://acmrc.com/press/ACM-ECP-brochure.pdf>.

Ravid, Avi, Avner Sharon, Amit Weingarten, Vladimir Machavariani, and David Scheiner. 2000. "Copper CMP Planarity Control Using ITM." *IEEE/SEMI Advanced Semiconductor Manufacturing Conference*, pp. 437-443.

SEMI. 2000. "Provisional Specification for CIM Framework Scheduling Component." San Jose, California. SEMI E105-1000.

2000. "Microsense II Capacitance Gaging System." www.adetech.com.

Chen, Argon and Ruey-Shan Guo. Feb. 2001. "Age-Based Double EWMA Controller and Its Application to CMP Processes." *IEEE Transactions on Semiconductor Manufacturing*, vol. 14, No. 1, pp. 11-19.

Mar. 5, 2001. "KLA-Tencor Introduces First Production-worthy Copper CMP In-situ Film Thickness and End-point Control System." http://www.kla-tencor.com/j/servlet/NewsItem?newsItemID=74.

Lee, Brian, Duane S. Boning, Winthrop Baylies, Noel Poduje, Pat Hester, Yong Xia, John Valley, Chris Koliopoulus, Dale Hetherington, HongJiang Sun, and Michael Lacy. Apr. 2001. "Wafer Nanotopography Effects on CMP: Experimental Validation of Modeling Methods." San Francisco, California: Materials Research Society Spring Meeting.

Tobin, K. W., T. P. Karnowski, L. F. Arrowood, and F. Lakhani. Apr. 2001. "Field Test Results of an Automated Image Retrieval System (Abstract)." *Advanced Semiconductor Manufacturing Conference, 2001 IEEE/SEMI*, Munich, Germany.

Tan, K. K., H. F. Dou, and K. Z. Tang. May-Jun. 2001. "Precision Motion Control System for Ultra-Precision Semiconductor and Electronic Components Manufacturing (Abstract)." *51st Electronic Components and Technology Conference 2001. Proceedings*, pp. 1372-1379. Orlando, Florida.

Jensen, Alan, Peter Renteln, Stephen Jew, Chris Raeder, and Patrick Cheung. Jun. 2001. "Empirical-Based Modeling for Control of CMP Removal Uniformity." Solid State Technology, vol. 44, No. 6, pp. 101-102, 104, 106. Cowan Publ. Corp.: Washington, D.C.

Jul. 5, 2001. "Motorola and Advanced Micro Devices Buy ObjectSpace Catalyst Advanced Process Control Product for Five Wafer Fabs." Semiconductor FABTECH. www.semiconductorfabtech.com/industry.news/9907/20.07.shtml.

Heuberger, U. Sep. 2001. "Coating Thickness Measurement with Dual-Function Eddy-Current & Magnetic Inductance Instrument (Abstract)." *Galvanotechnik*, vol. 92, No. 9, pp. 2354-2366+IV.

Pilu, Maurizio. Sep. 2001. "Undoing Page Curl Distortion Using Applicable Surfaces." *IEEE International Conference on Image Processing*. Thessalonica, Greece.

Oct. 15, 2001. Search Report prepared by the Austrian Patent Office for Singapore Patent Application No. 200004286-1.

Wang, LiRen and Hefin Rowlands. 2001. "A Novel NN-Fuzzy-SPC Feedback Control System." *8th IEEE International Conference on Emerging Technologies and Factory Automation*, pp. 417-423.

NovaScan 2020. Feb. 2002. "Superior Integrated Process Control for Emerging CMP High-End Applications.".

Mar. 15, 2002. Office Action for U.S. Appl. No. 09/469,227, filed Dec. 22, 1999.

Mar. 29, 2002. Office Action for U.S. Appl. No. 09/363,966, filed Jul. 29, 1999.

Moyne, J., V. Solakhian, A. Yershov, M. Anderson, and D. Mockler-Hebert. Apr.-May 2002. "Development and Deployment of a Multi-Component Advanced Process Control System for an Epitaxy Tool (Abstract)." *2002 IEEE Advanced Semiconductor Manufacturing Conference and Workshop*, pp. 125-130.

Sarfaty, Moshe, Arulkumar Shanmugasundram, Alexander Schwarm, Joseph Paik, Jimin Zhang, Rong Pan, Martin J. Seamons, Howard Li, Raymond Hung, and Suketu Parikh. Apr.-May 2002. "Advance Process Control Solutions for Semiconductor Manufacturing." Boston, Massachusetts: *13th Annual IEEE/SEMI Advanced Semiconductor Manufacturing Conference. Advancing the Science and Technology of Semiconductor Manufacturing. ASMC 2002*, pp. 101-106.

Campbell, W. J., S. K. Firth, A. J. Toprac, and T. F. Edgar. May 2002. "A Comparison of Run-to-Run Control Algorithms (Abstract)." *Proceedings of 2002 American Control Conference*, vol. 3, pp. 2150-2155.

Good, Richard and S. Joe Qin. May 2002. "Stability Analysis of Double EWMA Run-to-Run Control with Metrology Delay." *IEEE/CPMT International Electronics Manufacturing Technology Symposium*, pp. 355-363.

Smith, Stewart, Anthony J. Walton, Alan W. S. Ross, Georg K. H. Bodammer, and J. T. M. Stevenson. May 2002. "Evaluation of Sheet Resistance and Electrical Linewidth Measurement Techniques for Copper Damascene Interconnect." *IEEE Transactions on Semiconductor Manufacturing*, vol. 15, No. 2, pp. 214-222.

Johnson, Bob. Jun. 10, 2002. "Advanced Process Control Key to Moore's Law." Gartner, Inc.

Jun. 20, 2002. Office Action for U.S. Appl. No. 09/619,044, filed Jul. 19, 2000.

Itabashi, Takeyuki, Hiroshi Nakano, and Haruo Akahoshi. Jun. 2002. "Electroless Deposited CoWB for Copper Diffusion Barrier Metal." *IEEE International Interconnect Technology Conference*, pp. 285-287.

Jul. 9, 2002. International Search Report for PCT/US01/24910.

Jul. 23, 2002. Communication Pursuant to Article 96(2) EPC for European Patent Application No. 00 115 577.9.

Jul. 29, 2002. International Search Report for PCT/US01/27407.

Sep. 26, 2002. Office Action for U.S. Appl. No. 09/637,620, filed Aug. 11, 2000.

Oct. 4, 2002. International Search Report for PCT/US01/22833.

Oct. 15, 2002. International Search Report for PCT/US02/19062.

Oct. 23, 2002. International Search Report for PCT/US01/27406.

Oct. 23, 2002. Office Action for U.S. Appl. No. 09/469,227, filed Dec. 22, 1999.

Nov. 7, 2002. International Search Report for PCT/US02/19061.

Nov. 11, 2002. International Search Report for PCT/US02/19117.

Nov. 12, 2002. International Search Report for PCT/US02/19063.

Dec. 17, 2002. Office Action for U.S. Appl. No. 09/363,966, filed Jul. 29, 1999.

ACM Research, Inc. 2002. "ACM Ultra ECP® System: Electro-Copper Plating (ECP) Deposition." www.acmrc.com/ecp.html.

Applied Materials, Inc. 2002. "Applied Materials: Information for Everyone: Copper Electrochemical Plating." www.appliedmaterials.com/products/copper_electrochemical_plating.html.

KLA-Tencor Corporation. 2002. "KLA Tencor: Press Release: KLA-Tencor Introduces First Production-Worthy Copper CMP In-Situ Film Thickness and End-point Control System: Multi-Million Dollar Order Shipped to Major CMP Tool Manufacturer." www.kla-tencor.com/news_events/press_releases/press_releases2001/984086002.html.

Sonderman, Thomas. 2002. "APC as a Competitive Manufacturing Technology: *AMD's Vision for 300mm*." AEC/APC.

Takahashi, Shingo, Kaori Tai, Hiizu Ohtorii, Naoki Komai, Yuji Segawa, Hiroshi Horikoshi, Zenya Yasuda, Hiroshi Yamada, Masao Ishihara, and Takeshi Nogami. 2002. "Fragile Porous Low-k/Copper Integration by Using Electro-Chemical Polishing." *2002 Symposium on VLSI Technology Digest of Technical Papers*, pp. 32-33.

2002. "Microsense II—5810: Non-Contact Capacitance Gaging Module." www.adetech.com.

Feb. 10, 2003. Office Action for U.S. Appl. No. 09/619,044, filed Jul. 19, 2000.

Mar. 25, 2003. International Search Report for PCT/US02/24859.

Apr. 9, 2003. Office Action for U.S. Appl. No. 09/928,474, filed Aug. 14, 2001.

May 8, 2003. Office Action for U.S. Appl. No. 09/637,620, filed Aug. 11, 2000.

May 23, 2003. Written Opinion for PCT/US01/24910.

Jun. 18, 2003. Office Action for U.S. Appl. No. 09/655,542, filed Sep. 6, 2000.

Jul. 23, 2003. Invitation to Pay Additional Fees and Communication Relating to the Results of the Partial International Search for PCT/US02/19116.

Aug. 1, 2003. Written Opinion for PCT/US01/27406.

Aug. 8, 2003. PCT International Search Report from PCT/US03/08513.

Aug. 20, 2003. Written Opinion for PCT/US01/22833.

Aug. 25, 2003. Office Action for U.S. Appl. No. 10/100,184, filed Mar. 19, 2002.

Sep. 15, 2003. Office Action for U.S. Appl. No. 09/928,474, filed Aug. 14, 2001.

Oct. 14, 2003. PCT International Search Report from PCT/US02/21942.

Oct. 20, 2003. PCT International Search Report from PCT/US02/19116.

Oct. 23, 2003. PCT International Preliminary Examination Report from PCT/US01/24910.

Nov. 5, 2003. Office Action for U.S. Appl. No. 10/172,977, filed Jun. 18, 2002.

Dec. 1, 2003. Office Action for U.S. Appl. No. 10/173,108, filed Jun. 18, 2002.

"NanoMapper wafer nanotopography measurement by ADE Phase Shift." Printed Dec. 9, 2003. http://www.phase-shift.com/nanomap.shtml.

"Wafer flatness measurement of advanced wafers." Printed Dec. 9, 2003. http://www.phase-shift.com/wafer-flatness.shtml.

"ADE Technologies, Inc.—6360." Printed Dec. 9, 2003. http://www.adetech.com/6360.shtml.

"3D optical profilometer MicroXAM by ADE Phase Shift." Printed Dec. 9, 2003. http://www.phase-shift.com/microxam.shtml.

"NanoMapper FA factory automation wafer nanotopography measurement." Printed Dec. 9, 2003. http://www.phase-shift.com/nanomapperfa.shtml.

Dec. 11, 2003. Office Action for U.S. Appl. No. 09/943,383, filed Aug. 31, 2001.

Dec. 16, 2003. International Search Report for PCT/US03/23964.

Cunningham, James A. 2003. "Using Electrochemistry to Improve Copper Interconnects." <http://www.e-insite.net/semiconductor/index.asp?layout=article&articleid=CA47465>.

Jan. 20, 2004. Office ACtion for U.S. Appl. No. 09/927,444, filed Aug. 13, 2001.

Jan. 23, 2004. International Search Report for PCT/US02/24860.

Feb. 2, 2004. Office Action for U.S. Appl. No. 09/363,966, filed Jul. 29, 1999.

Adams, Bret W., Bogdan Swedek, Rajeev Bajaj, Fritz Redeker, Manush Birang, and Gregory Amico. "Full-Wafer Endpoint Detection Improves Process Control in Copper CMP." *Semiconductor Fabtech*—12$^{th}$ Edition. Applied Materials, Inc., Santa Clara, CA.

Berman, Mike, Thomas Bibby, and Alan Smith. "Review of In Situ & In-line Detection for CMP Applications." *Semiconductor Fabtech*, 8$^{th}$ Edition, pp. 267-274.

Dishon, G., D. Eylon, M. Finarov, and A. Shulman. "Dielectric CMP Advanced Process Control Based on Integrated Monitoring." Ltd. Rehoveth, Israel: Nova Measuring Instruments.

"Semiconductor Manufacturing: An Overview." <http://users.ece.gatech.edu/~gmay/overview.html>.

US 6,150,664, 11/2000, Su (withdrawn)

\* cited by examiner

FIG. 1    (PRIOR ART)

| | | | | | |
|---|---|---|---|---|---|
| CURRENT STATE: | INACTIVE | | | CREATE R2R MODEL... | |
| DOE PLAN NAME: | PETEOS | | | | |
| RESOURCE TYPE: | OXIDE CMP PROFILER : PLATEN1 | ▶ | | | |

309

| FACTORS | RESPONSES | CASES | BLOCKS | EXPERIMENTS |
|---|---|---|---|---|

| RESPONSE NAME | UNITS | LSL | USL | TYPE | DEFAULT VALUE |
|---|---|---|---|---|---|
| THICKNESS | ANGSTROMM | 2000 | 6000 | RAW DATA PA | 4000 |
| PAD LIFE | HRS | 0 | 40 | MEASURED VARI | |

401 403 405

[ NEW... ]
[ OPEN... ]
[ DELETE ]

[ ACTIVATE ]  [ SAVE ]  [ SAVE AS ]  [ HELP ]

FIG. 4

| | | | | |
|---|---|---|---|---|
| | | | | AUTO GENERATE —701 |
| CURRENT STATE: | INACTIVE | | CREATE R2R MODEL... | IMPORT... —703 |
| DOE PLAN NAME: | PETEOS | | | ADD ROW —705 |
| RESOURCE TYPE: | OXIDE CMP PROFILER : PLATEN1 ▶ | | | INSERT ROW —707 |
| | 311 | | | DELETE ROW —709 |

| FACTORS | RESPONSES | CASES | BLOCKS | EXPERIMENTS |
|---|---|---|---|---|

| CASE | BASELINE TIME | CENTER TIME | EDGE TIME |
|---|---|---|---|
| 1 | 60000 | 0 | 15000 |
| 2 | 20000 | 0 | 5000 |
| 3 | 60000 | 20000 | 15000 |
| 4 | 20000 | 0 | 15000 |
| 5 | 40000 | 10000 | 10000 |
| 6 | 60000 | 0 | 5000 |
| 7 | 20000 | 20000 | 5000 |
| 8 | 60000 | 20000 | 5000 |
| 9 | 40000 | 10000 | 10000 |
| 10 | 20000 | 20000 | 15000 |

711

ACTIVATE    SAVE    SAVE AS    HELP

FIG. 7

| PE TEOS | | | | | | □ ◻ ⊠ |
|---|---|---|---|---|---|---|
| CURRENT STATE: | INACTIVE | | | | | CREATE R2R MODEL... |
| DOE PLAN NAME: | PE TEOS | | | | | |
| RESOURCE TYPE: | CVD PRODUCER : PE-CVD | ▶ | | | | |

| FACTORS | RESPONSES | CASES | BLOCKS | EXPERIMENTS | | | |
|---|---|---|---|---|---|---|---|
| EXPERIMENT | BLOCK | CASE | RFPOWER_1 | RFPOWER_2 | SPACING_1 | SPACING_2 | STEPTIME |
| 1 | 1 | 1 | 700 | 700 | 250 | 250 | 55000 |
| 2 | 1 | 2 | 650 | 650 | 245 | 245 | 55000 |
| 3 | 1 | 3 | 700 | 700 | 245 | 245 | 55000 |
| 4 | 1 | 4 | 700 | 700 | 250 | 250 | 55000 |
| 5 | 1 | 5 | 650 | 650 | 250 | 250 | 55000 |
| 6 | 1 | 6 | 650 | 650 | 255 | 255 | 55000 |
| 7 | 1 | 7 | 750 | 750 | 245 | 245 | 55000 |
| 8 | 1 | 8 | 750 | 750 | 255 | 255 | 55000 |
| 9 | 1 | 9 | 750 | 750 | 250 | 250 | 55000 |
| 10 | 1 | 10 | 700 | 700 | 255 | 255 | 55000 |
| 11 | 1 | 1 | 700 | 700 | 250 | 250 | 55000 |

ADD ROW  
INSERT ROW  
DELETE ROW

ACTIVATE  SAVE  SAVE AS  HELP

FIG. 7B

AUTOMATED DESIGN AND EXECUTION OF EXPERIMENTS WITH INTEGRATED MODEL CREATION FOR SEMICONDUCTOR MANUFACTURING TOOLS

RELATED APPLICATION

This application claims the priority of U.S. Provisional Application No. 60/441,147 filed on Jan. 21, 2003, which is incorporated herein by reference in its entirety.

FIELD OF THE INVENTION

The present invention is directed to automatically designing experiments for a semiconductor tool, running the experiments and creating models based on the results obtained by running the experiments.

BACKGROUND OF THE INVENTION

As microelectronic device feature sizes continue to shrink, it is necessary to have tighter controls to maintain high yields. Such tighter controls begin at a tool level. A conventional tool 100 is schematically shown in FIG. 1. The tool 100 can include an etcher, depositor, polisher or the like. Any combination of these can also be included in the tool. A typical tool is controlled by a tool controller 103 which communicates with a factory controller via a communication port 105. In particular, the tool controller 103 may receive process recipes from the factory controller via the communication port 105 and process wafers in accordance with the received recipes.

The tool 100 can be controlled on a run-to-run control basis for various semiconductor manufacturing processes. The run-to-run control reduces unacceptable variations of outputs (i.e., wafers processed by the tool) from targets. In the run-to-run control of such a tool, the process recipe is modified between process runs so as to minimize process drift, shift, and variability.

Creating accurate and precise run-to-run control starts from designing and running experiments on the tool for an eventual modeling of the tool. Designing a set of experiments is called DOE (Design of Experiments). A good DOE establishes the relationship between variables that may have a predictable impact on the processing output a user wishes to control, e.g., one or more film properties such as film thickness, while keeping the required number of experiments low.

Conventionally, a DOE system 107 configured to generate a DOE plan that includes a set of experiments is typically not integrated with the tool 100. Hence, the experiments of the DOE plan are run on the tool 100 by a user manually setting up the tool 100. When the experiments of the DOE plan are run, data relating to process recipe parameters and process outcome are collected. The collected data are then used in creating one or more models in a modeling environment 109.

Conventionally, the modeling environment 109 is also not integrated with the tool 100. In the modeling environment 109, the models are created, and the models can be represented as raw data that reflects the tool, or it can be represented by equations, for example, multiple input-multiple output linear, quadratic and general non-linear equations, which describe the relationship among the variables of the tool 100.

The DOEs, models and eventual run-to-run control of tools are, conventionally, performed on a lot-to-lot basis. This is because it is difficult to collect the data from different tools, put them together and control experiments at a wafer-to-wafer level. As noted above, the tool 100, DOE system 107, and modeling environment 109 are not integrated together. Therefore, once a DOE plan is created, its experiments are run manually on the tool 101 and the resulting data are collected manually. Even if the DOE data are collected electronically, it needs to be reformatted to be used in the modeling environment 109. This also means that there cannot be any automated coordination between the DOE systems 107 and modeling environment 109. These shortcomings made the use of the DOEs a difficult process for a user of the tool 100.

SUMMARY OF THE INVENTION

In embodiments of the present invention, a user is allowed to design experiments, i.e., use DOE methodologies, and then automatically execute the experiments on a tool and automatically collect all the data related to the experiment. The automation is achieved by, among other things, integrating the DOE system and modeling system with the tool.

Once the above steps have been completed, the collected data from the DOE run is used in creating one or more models that can be used in generating process recipes to control tools.

DESCRIPTION OF THE DRAWINGS

The detailed description of the present application showing various distinctive features may be best understood when the detailed description is read in reference to the appended drawings in which:

FIG. 4 is an image of a graphical user interface configured to capture responses of a DOE plan by interacting with a user according to embodiments of the present invention;

FIG. 7 is an image of a graphical user interface illustrating experiment cases of a DOE plan by interacting with a user according to embodiments of the present invention;

FIG. 7B is an image of a graphical user interface illustrating designed experiments of a DOE plan by interacting with a user according to embodiments of the present invention;

DETAILED DESCRIPTION

Various embodiments of the present invention can be implemented in hardware, firmware, software or any combination of them. For the sake of clarity, the descriptions below are provided in terms of software implementations. In particular, the description is provided in the vernacular of the object-oriented programming field. However, the concepts of embodiments of the present invention are not limited to the implementations in the object-oriented programming field.

Figure 1:
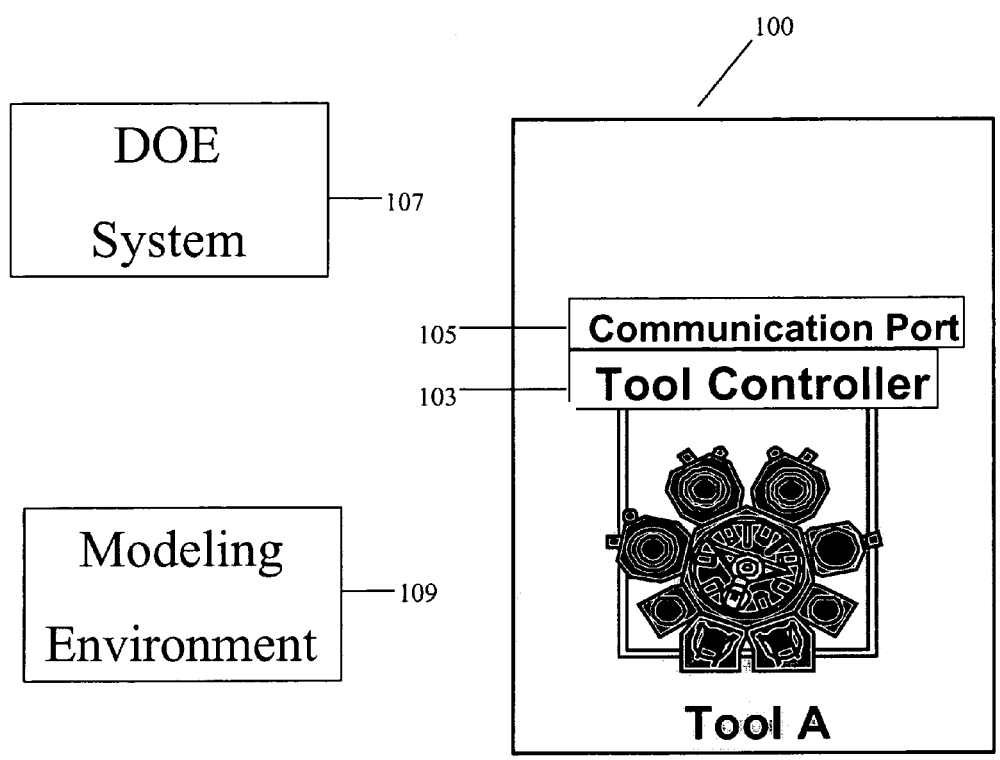
FIG. 1 is a schematic diagram of an example semiconductor processing tool, a DOE system and a modeling environment.
Figure 2:
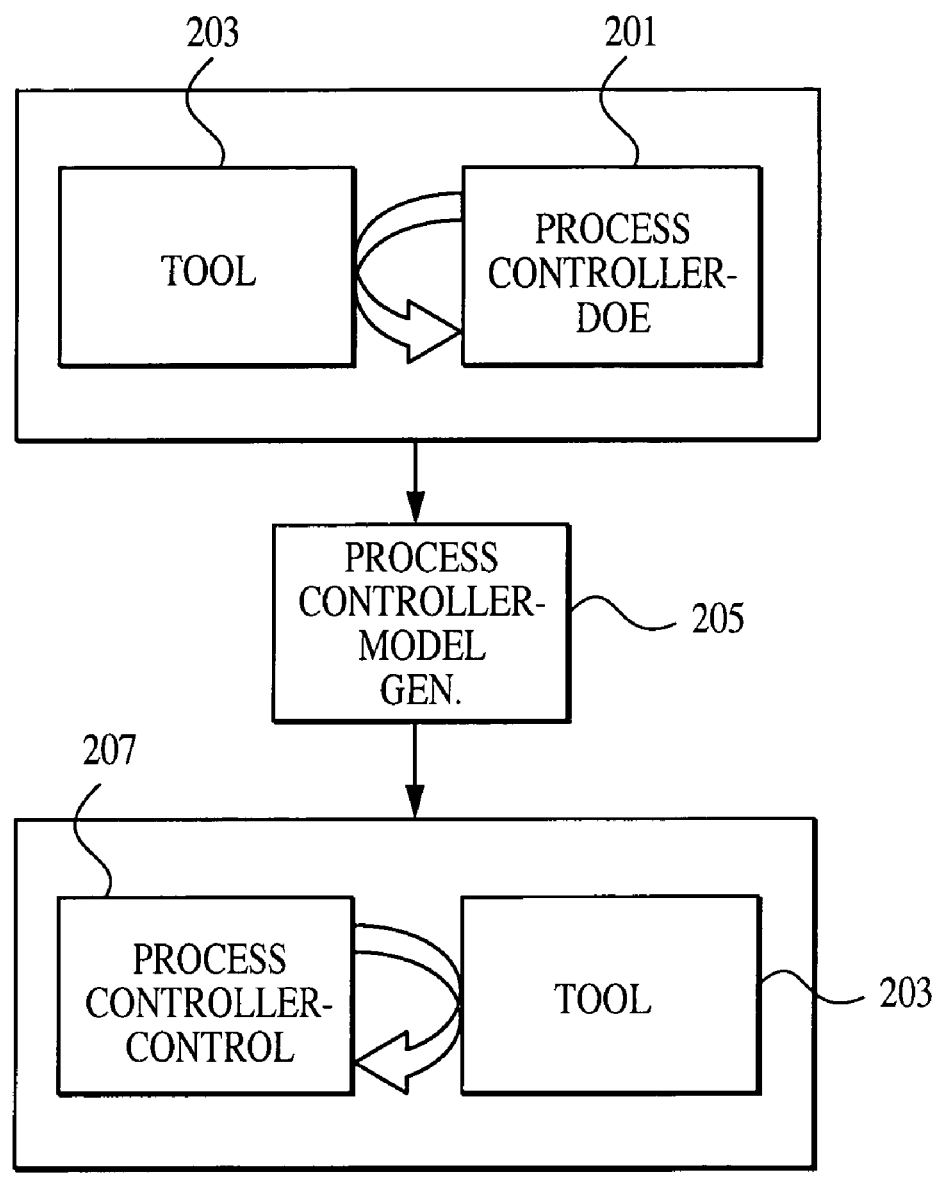
FIG. 2 is a block diagram/flow chart illustrating high level processes of embodiments of the present invention.

Now referring to FIG. 2, the figure illustrates a high level a part flow chart and part block diagram of embodiments of the present invention. Embodiments of the present invention include a process that is a combination of various parts such as a DOE 201, a Model Gen. 205 and a Controller 207. In particular, the process controller includes software programs necessary to design a DOE plan for a tool (a Processor Controller-DOE) 201, create a corresponding model (a Processor Controller-Model Gen.) 205 of the tool and a controller (a Processor Controller-Control) 207 to control the tool using process recipes generated based on the model. All these software programs are integrated with each other (e.g., send/receive data, coordinate actions, etc.)

In particular, a DOE plan is automatically designed and its experiments are performed on a tool 203. As the experiment of the DOE plan are run, the process controller-DOE 201 automatically collects and stores data. The stored data are then used by the model generator of the process controller-Model Gen. 205 to automatically create a model of the tool 203. The process controller-Control 207 is capable of automatically generating one or more process recipes for processing one or more wafers on the tool 203. Each of the above steps is described in detail below.

Embodiments of the present invention are described in terms of two perspectives. The first is described in terms of a set of user interfaces in FIGS. 3-9, the second is described in terms of a set of flow charts in FIGS. 9-10.

Now turning to describe embodiments of the present invention in terms of user interfaces, FIGS. 3-6 illustrate various features in an example user interface window 300 that allows a user to make selections for automatically generating a DOE plan. The window is called a "New DOE Plan" (hereinafter the "DOE window"). Using the DOE window 300, the user may set factors, responses, cases, blocks and experiments. Each of these is described in detail below.

Figure 3:
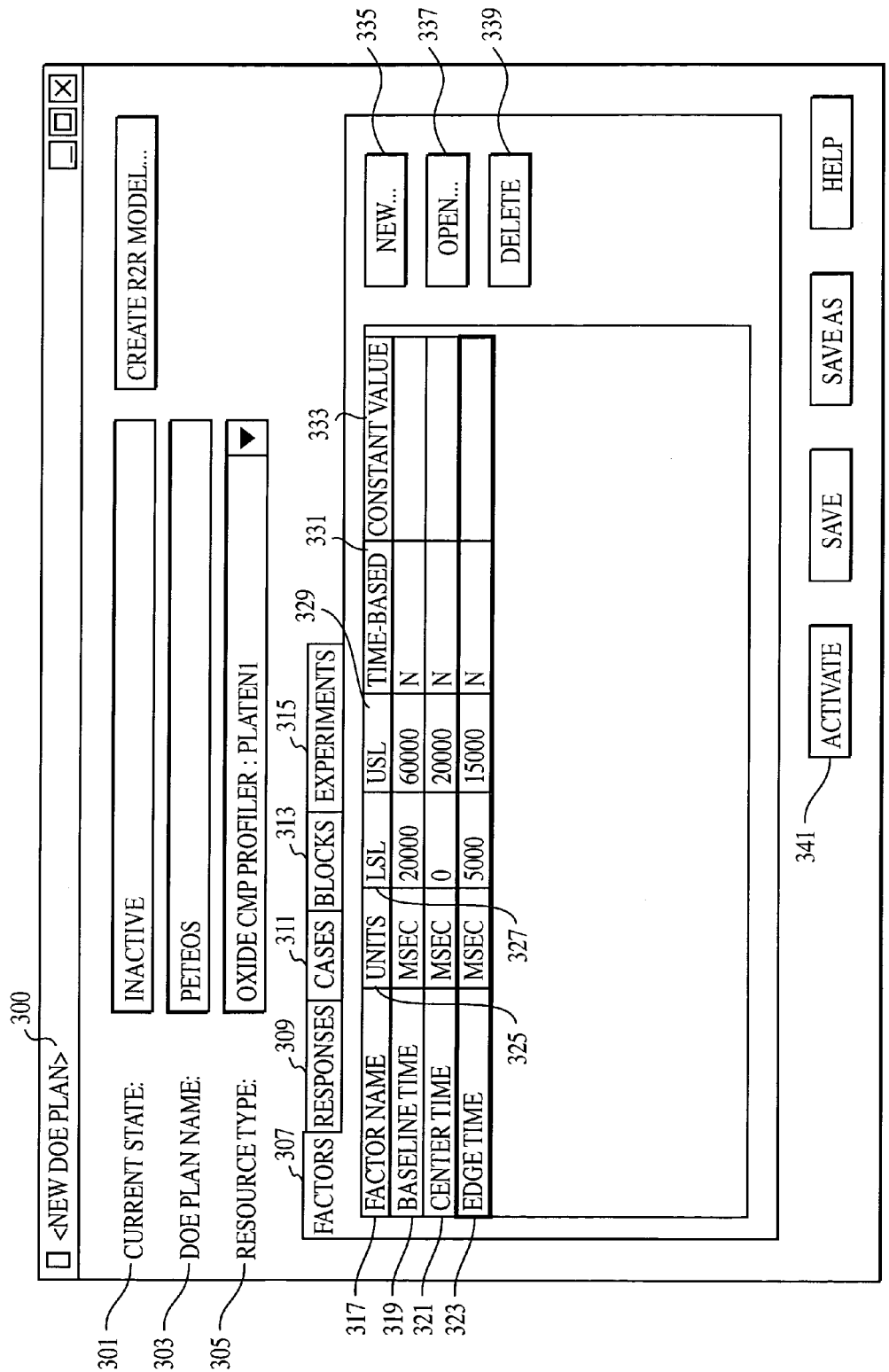
FIG. 3 is an image of a graphical user interface configured to capture factors of a DOE plan by interacting with a user according to embodiments of the present invention.

As shown in FIG. 3, the DOE window 300 includes panels for a "Current State" 301, "DOE plan name" 303, and "Resource type" 305. With respect to the Current State 301, in the vernacular of the object-oriented programming field, each object in embodiments of the present invention is created as inactive, including the DOE plan object. The DOE plan object may remain inactive until an Activate button 341 is selected by the user. With respect to the DOE plan name 303, it is the name of the DOE plan to be created. The user may arbitrarily enter the name. With respect to the Resource type 305, it is the tool for which the DOE plan is to be created. In this example, the type of the tool is an oxide CMP (Chemical-Mechanical-Planarization) profiler.

In addition to the panels, in FIG. 3, three buttons are shown at the right-hand side: a "New" button 335, "Open" button 337, "Delete" button 339. These buttons allow the user to create a new DOE plan, open an existing DOE plan, and delete an existing DOE plan, respectively.

Five tabs are also illustrated in FIG. 3: Factors 307, Responses 309, Cases 311, Blocks 313, and Experiments 315. In FIG. 3, the table shown (headed by "Factor Name") 317 corresponds to when the Factors tab 307 is selected. A factor is a parameter to be adjusted between experiments while running the DOE plan. In other words, factors can be recipe parameters of the tool. The user can select a set of factors from a field of factors. As the example depicted in FIG. 3 shows, the factors can be a baseline time 319, center time 321, edge time 323, etc. These are the parameters relating to an oxide CMP profiler tool. For this set of factors, their units are in milliseconds. The term "LSL" 327 means the lower specification limit, and the term "USL" 329 means the upper specification limit. After selecting the factors, the user can enter the values for the LSL and USL. The user can specify if the factors are to be time-based or constant value.

The time-based parameter is a parameter that has linear output values in function of time. If the parameter is actually not a linear function in time, the collection of the output values can be time scaled to ensure that the collected data appear as a linear function in time. This may remove any non-linearity in the collected data. For the constant valued parameter, the value of the designated parameter is set at a specific value through out the experiments.

In FIG. 4, the table shown (headed by "Response Name") 401 corresponds to when the Responses tab 309 is selected. The responses are the data collected based upon the performance of the tool. For example, as shown in FIG. 4, the data can be collected for a thickness 403 and pad life 405 of the oxide CMP profiler tool.

Figure 5:
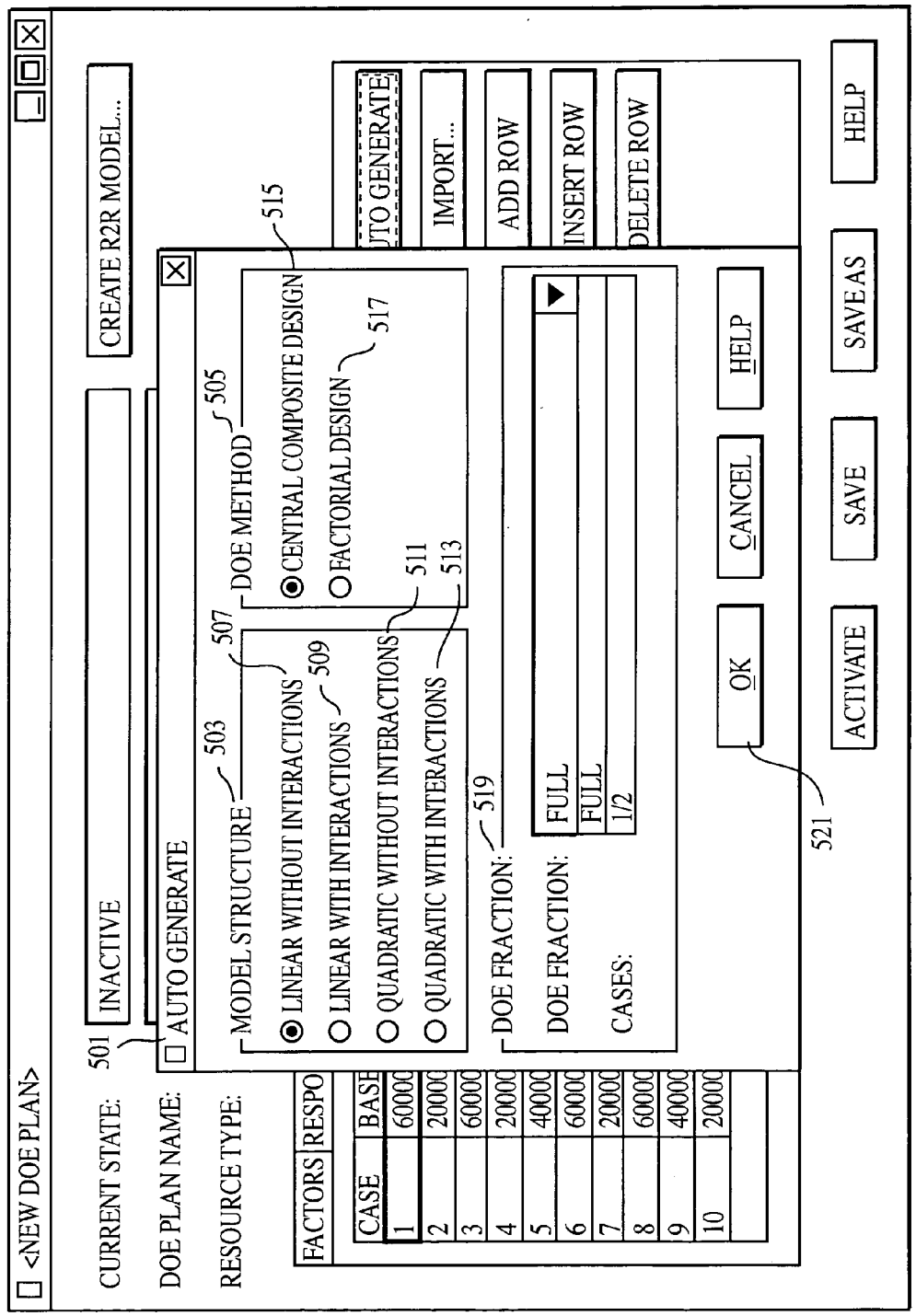
FIG. 5 is an image of a graphical user interface configured to capture parameters for an Auto Generate window of a DOE plan by interacting with a user according to embodiments of the present invention.

After the factors and responses have been selected, the user then may select the cases tab 311. When the cases tab is selected, a cases table will be shown to the user. An example of a cases table 711 is shown in FIG. 7. Although the example cases table 711 in FIG. 7 illustrates ten cases, the table 711 may show no cases when the cases tab is first selected. Subsequently, the cases can be automatically generated by selecting an "Auto Generate" button 701. When the "Auto Generate" button 701 is selected, an Auto Generate window 501 is shown to the user, as illustrated in FIG. 5. Using the Auto Generate window 501, the user is allowed to select the DOE structure 503, DOE method 505 and DOE fraction 519.

For the model structures, the user is allowed to select one of four (each either with or without a constant term, listed as $k_0$ in the equation below): 1) Linear without interactions 507; 2) Linear with interactions 509; 3) Quadratic without interactions 511; and 4) Quadratic with interactions 513. An example equation of the linear without interactions can be $$y=k_0+k_1x_1+k_2x_2+k_3x_3$$

where the y represents predicted output values, the values of $k_i$ are chosen such that the value of y is "close" to the value of the response which is being modeled for all the values of $x_i$ in the experiment, and the x's represent values of recipe parameters or other measured parameters. An example equation of the linear with interactions can be:

$$y=k_0+k_1x_1+k_2x_2+k_3x_3+k_{12}x_1x_2+k_{23}x_2x_3+k_{13}x_1x_3$$

One difference between the linear without interactions and linear with interactions structures is that the equation with interactions model structure includes multiplied factors (e.g., the $x_1x_2$ and $x_2x_3$ terms). With respect to the quadratic model structures, they are similar to the linear structures except that the quadratic model structures include quadratic terms instead of the linear terms, e.g., $$y=k_0+k_1x_1+k_2x_2+k_3x_3+k_{12}x_1x_2+k_{23}x_2x_3+k_{13}x_1x_3+\\k_{11}k_1^2+k_{22}x_2^2+k_{33}x_3^2$$

Figure 6:
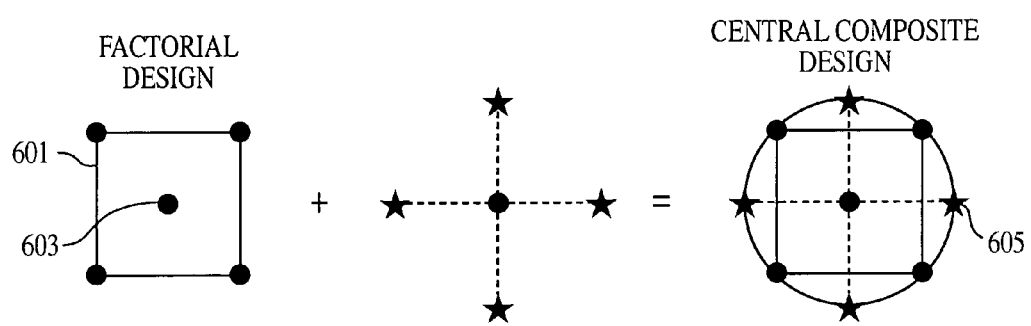
FIG. 6 is a graph illustrating factorial and central composite designs according to embodiments of the present invention.

After selecting a model structure, a DOE method may be selected. Two example DOE methods are provided: a factorial design 517 and central composite design 515. The factorial design generates cases for all possible combinations of high and low for all the parameters involved for a full factorial design. A schematic depiction of cases for a full factorial design 601 of a two-parameter set is shown in FIG. 6. More specifically, once a central point 603 has been selected, the full factorial design generates minimum and maximum combinations from the central point. The central composite design 605 is also graphically illustrated in FIG. 6. These designs are well known in the art.

The central composite design is preferably used for non-linear models, and the factorial model is preferably used for linear type models. However, in embodiments of the present invention, the central composite design can be used for linear models, and the factorial model can be used for non-linear type models. With respect to the DOE fraction 519, generating and running full factorial or central composite experimental designs can generate statistically redundant data points. Using this characteristic, a fraction of the experiments can be selected (e.g., Full, ½, ¼, etc.) as shown in the DOE faction sub-panel 509.

Based on the selections made by the user, corresponding cases are automatically generated when the user clicks an "OK" button 521. An example of resulting set of cases is illustrated in a table headed by "Case" 711 in FIG. 7. In that example, ten cases are listed, one case for each extreme values and middle values of the baseline time, center time, and edge time. (Refer back to FIG. 4 for the extreme values of the factors.)

In embodiments of the present invention, the cases/experiments can also be imported from other DOE systems by using an "Import" button 703. An example of the other DOE systems can be Design-Expert Software manufactured by Stat-Ease, Inc., located in Minneapolis, Minn.

Manual entry of cases and/or manipulations of imported or auto-generated cases are also contemplated within embodiments of the present invention. More specifically, the case values can manually be typed into the table and rows can be added, inserted, or deleted by an "AddRow" button 705, "InsertRow" button 707, and "DeleteRow" button 709, respectively.

Figure 7A:
FIG. 7A is an image of a graphical user interface illustrating block selections of a DOE plan by interacting with a user according to embodiments of the present invention.

Once a list of cases is generated, the list can also be blocked. In a "Blocks" panel, a number of blocks can be selected and specified for each list and corresponding responses. An example block set is illustrated in FIG. 7A. For example, one block can be assigned for three pad life values (e.g., high, mid, low). In such an example setup, thirty (i.e., ten cases times three blocks) experiments would eventually be generated. An example list of designed experiments are illustrated in FIG. 7B.

For a novice user, the above-described parameters can be preset. In particular, the entries made using the graphical interfaces described above can be preset to a set of specific preset values. This allows the steps of designing a DOE plan, running the experiments and collecting the data to all be automated with minimal user intervention.

After the DOE plan is automatically generated, the experiments specified in the DOE plan are run. Because the processor controller-DOE 201 is integrated with the tool 203, the DOE plan is automatically executed without user interventions. The user can observe as experiments are being performed and respond to any possible alerts (e.g., supply more wafers to the tool to complete the experiments). The experiments are run and data are collected on a wafer-by-wafer basis rather than on a lot-by-lot basis.

The data collected while running the experiments in the DOE plan are automatically formatted such that they can be used by the processor controller-Model Gen. 205 in creating a run-to-run model. In preparation of creating the run-to-run model, the user can select a formula type using, for example, a Formula type window 801 shown in FIG. 8.

More specifically, the Formula type window 801 allows the user to select one of four formula types: linear without interactions 803; linear with interactions 805; quadratic without interactions 807; and quadratic with interactions 811. The equations for these formulas are similar to the equations describe above in connection with FIG. 5. In additions to the four formulas, the user is allowed to enter a more general time-based or non-time-based linear-in-parameters model structure by selecting a "Use Template" option 813. Using this option, the user then enters terms 817 and designates whether the terms are time-based in a Time-Base designating field 819.

In embodiments of the present invention, the collected data can be transformed to create new sets of data. For example, assume the DOE plan collected a set of measurements on a wafer, e.g., 1-25, the first 5 corresponding to a specific region on the wafer, the second 5 corresponding to another region on the wafer, then a transformation can be setup so that data for region 1 as the average of the first 5 points can be created. Subsequently, a model to determine how certain measured variables or recipe parameters could affect this specific controlled output can be created. In another example, taking a logarithm of a certain set of the collected data can create a new set of data.

When a formula is selected, the coefficients for the formula are calculated by the regression method. The method is performed, for example, in the following manner for a multiple input, single output system:

$$\hat{y}(k)=b^T\phi(k),$$

where $\hat{y}(k)$ is the (scalar) output for each experiment k of the predicted values, $\phi(k)$ is the vector of inputs for each experiment k, and b is a vector of model coefficients.

The set of data obtained in the DOE is represented as:

$$y = \begin{bmatrix} y(1) \\ \vdots \\ y(N) \end{bmatrix}, \Phi = \begin{bmatrix} \varphi^T(1) \\ \vdots \\ \varphi^T(N) \end{bmatrix}$$

where y is a vector of the measured outputs from the DOE, and Φ is a matrix made up of the vectors of inputs corresponding to the conditions that result in each of the elements of y(k). The model coefficients, b, which provides the best fit (e.g., in the least squares sense) is provided by following equation:

$$b = (\Phi^T \Phi)^{-1} \Phi^T y$$

An estimate of the covariance matrix for b is given through similar calculations. The correct method for estimating the covariance matrix, P, is given by:

$$P = \sigma \left[ \frac{1}{N} \sum_{k=1}^{N} \varphi(k) \varphi^T(k) \right]^{-1}$$

where σ is the prediction error variance defined as:

$$\sigma = \frac{1}{N} \sum_{k=1}^{N} \varepsilon^2(k)$$

and $$\varepsilon^2(k) = (y(k) - \hat{y}(k))^2$$

with ŷ(k) being the prediction at time k as defined above.

Figure 8:
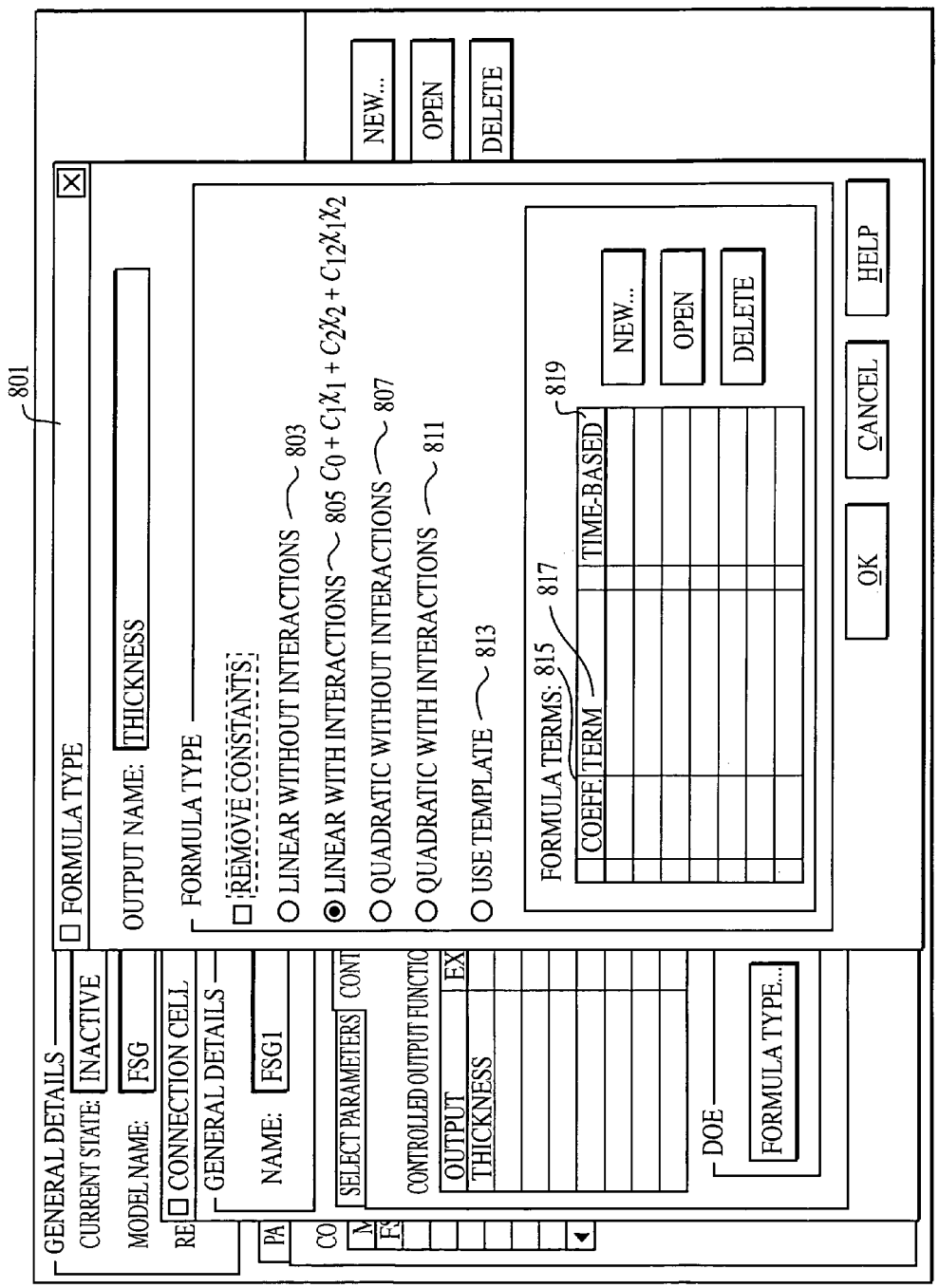
FIG. 8 is an image of a graphical user interface configured to capture a Formula Type of a model creation by interacting with a user according to embodiments of the present invention.

Once the coefficients are calculated as described above, the model is created based on the formula selected in FIG. 8 and the coefficients. An example of the accuracy of the predictions of an example model 901 can be statistically illustrated in FIG. 9. The DOE results in FIG. 9 show predicted values 903, actual values 905 and residual values 907.

Figure 9:
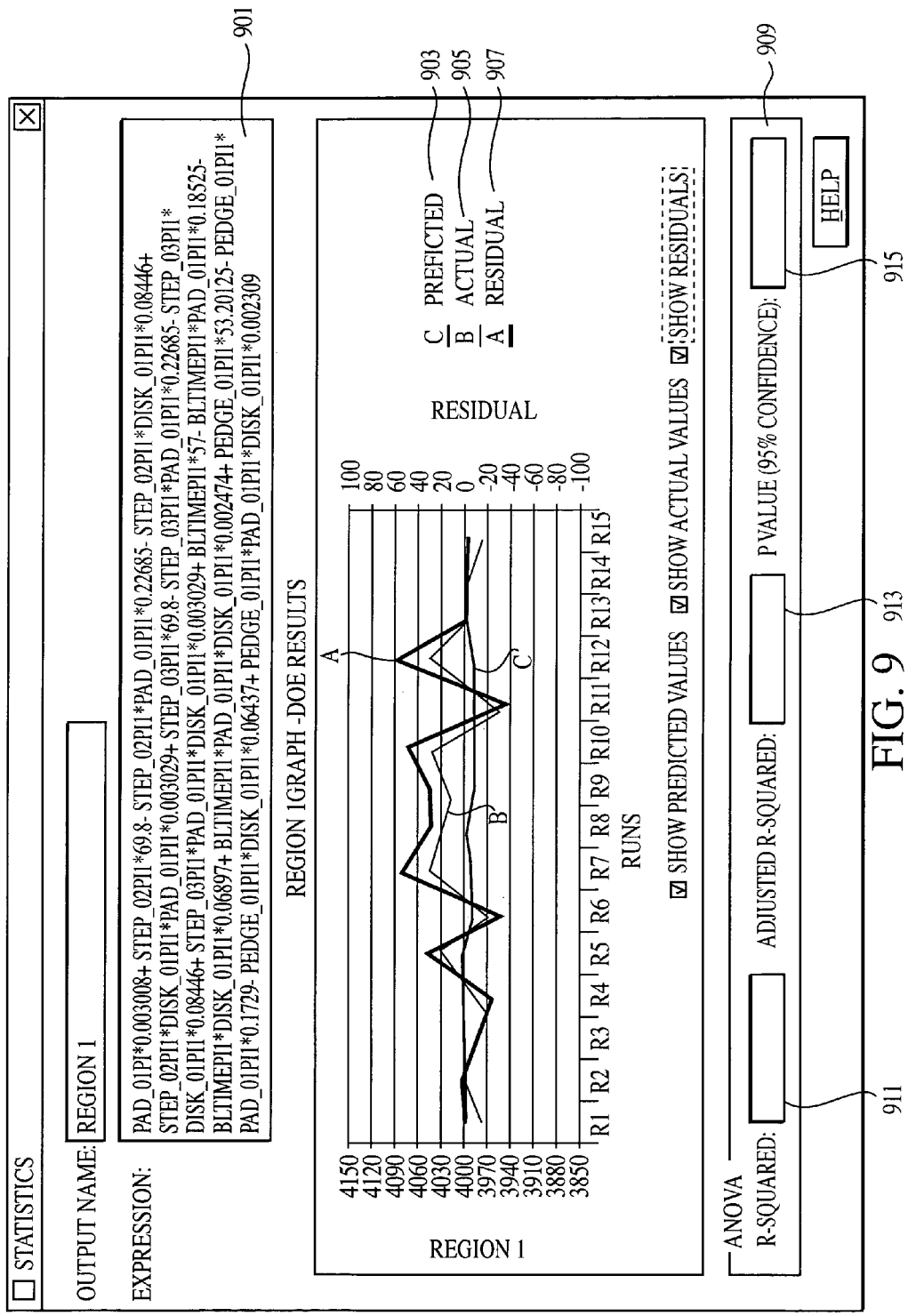
FIG. 9 is an image of a graphical user interface illustrating statistical results according to embodiments of the present invention.

FIG. 9 also includes an ANOVA (analysis of variance) window 909 configured to show statistical values such as the $R^2$ value 911, adjusted $R^2$ value 913 and P value 915. These statistical values are calculated as known in the art.

When the selected model yields unsatisfactory results, a different model can be selected. However, if no model yields satisfactory results one or more of the following approaches can be taken depending upon the source of the modeling issue: 1) start over by designing a new DOE plan to execute and collect data; 2) run a new set of experiments with a new DOE augmenting the existing data; 3) import previously run data; and/or 4) import data from another DOE system (e.g., an external system such as the Design-Expert described above). With respect to the imported data, the modeling and analyses can be performed using only the imported data, the data collected data, or any combination of them. This allows the imported data to augment the collected data. Once a satisfactory model is created, the model is then used in controlling the tool. The actual control is performed by process controller-Control 207.

Figure 10:
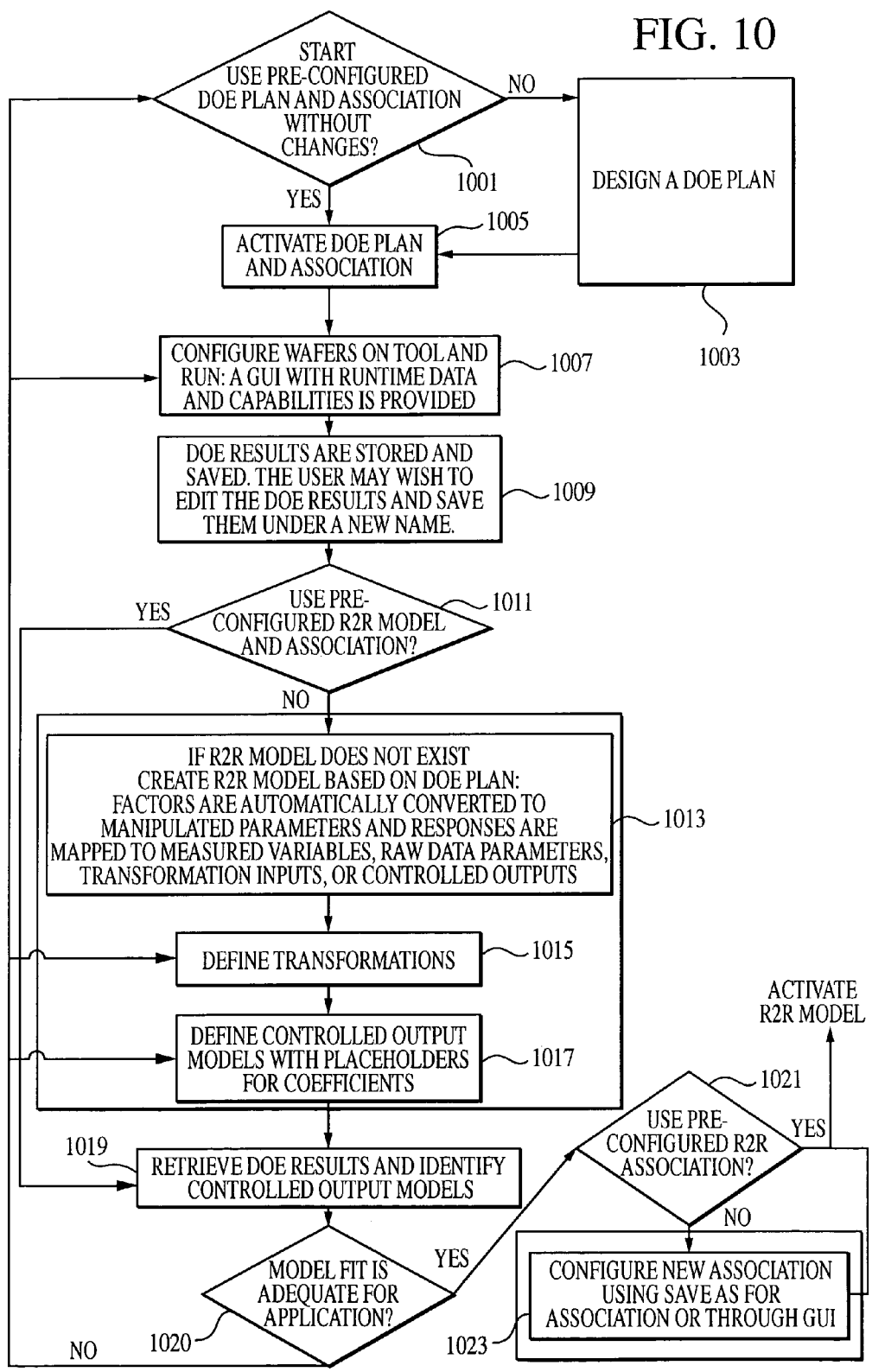
FIG. 10 is a flow chart illustrating various steps in generating a model according to embodiments of the present invention.
Figure 11:
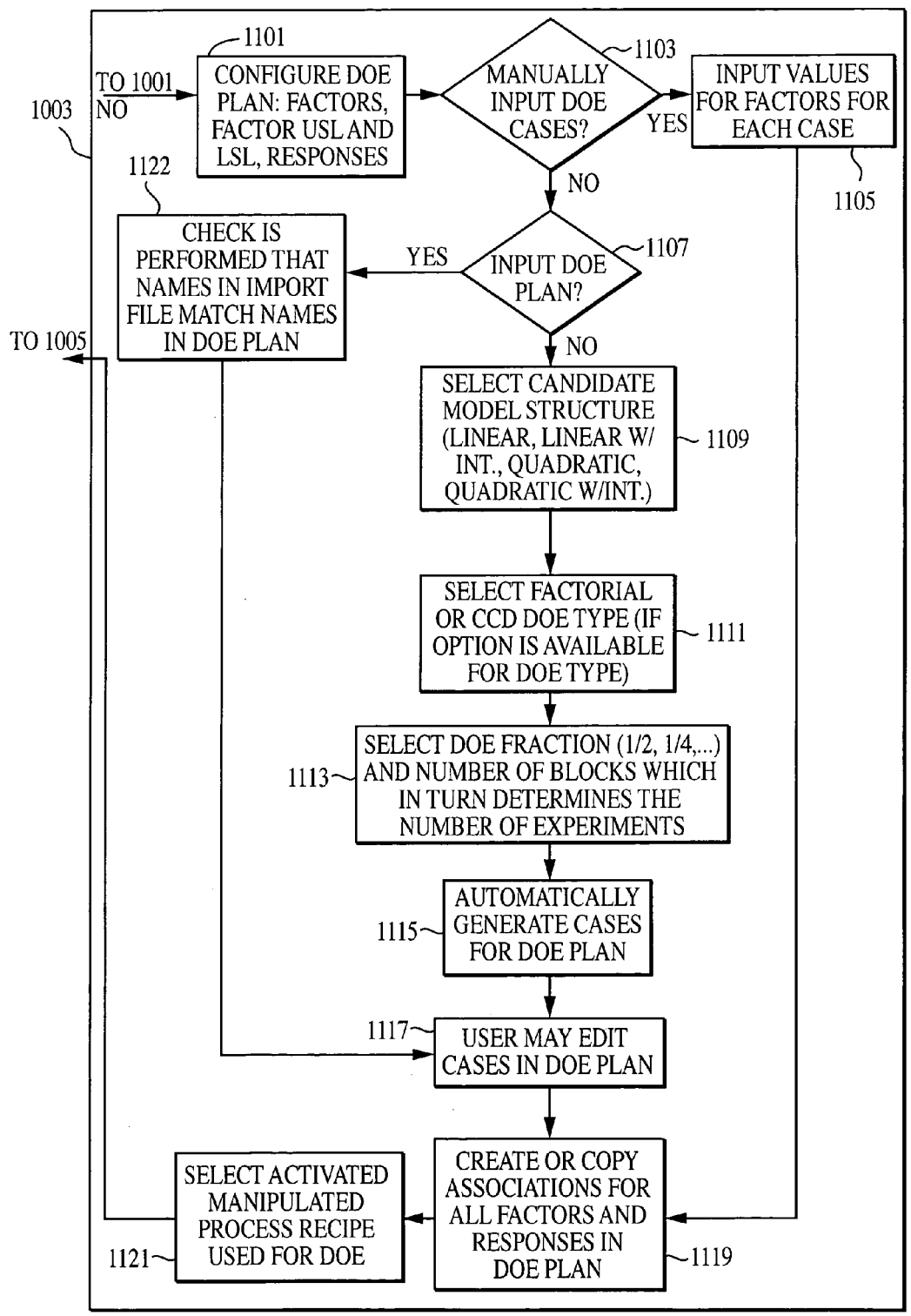
FIG. 11 is a flow chart illustrating various steps in designing a DOE plan according to embodiments of the present invention.

Now turning to describe embodiments of the present invention using flow charts, FIGS. 10 and 11 illustrate example steps in the designing and running of a DOE plan and creating a run-to-run model. In particular, FIG. 10 describes the running of a DOE plan and FIG. 11 describes the designing of a DOE plan.

First turning to FIG. 10, the user decides whether to use a pre-configured DOE plan and association without changes. The association means that the factors and responses in the DOE plan are associated with the actual data, which are collected or sent to the tool. If the user chooses to design a new DOE plan, the example steps shown in FIG. 11 are executed. If the user chooses to use a pre-configured DOE plan and association, the following steps are executed.

In step 1005, the user activates the DOE plan and association (either newly created, selected from the pre-configured ones, and/or imported from an external source). In step 1007, the user can configure wafers on the tool and run the activated DOE and association. In embodiments of the present invention a graphical user interface to display runtime data and capability can also be provided as described above in connection with the example graphical user interfaces. At this point, the actual run of the DOE and association is automated in embodiments of the present invention.

In step 1009, the data obtained as the result of running the DOE and association are stored. In embodiments of the present invention, the stored data can be edited or saved under a user specified name. A graphical user interface can be provided for this purpose.

In step 1011, the user is asked to decide either to use a pre-configured run-to-run (R2R) model or an association. If a pre-configured run-to-run model and run-to-run association is to be used, the next step is 1019. Otherwise, steps 1013, 1015 and 1017 are performed.

In step 1013, if a run-to-run model does not exists, a run-to-run model based on the DOE plan is created. In particular, the factors are automatically converted to variables such as manipulated parameters and responses are mapped to variables such as measured variables, raw data parameters, transformation inputs or controlled outputs.

In step 1015, the user may define transformations. Example transformations were described above in connection with FIG. 8.

In step 1017, controlled output models with place holders for coefficients are defined.

Now turning back to step 1019, which would have been executed had there been a pre-configured run-to-run model and association, the DOE results (saved in step 1009) are retrieved and a controlled output model is identified.

In step 1020, a determination is made as to whether the model is adequate for the designated application. If it is not adequate, then the steps from 1001, 1007, 1015 or 1017 can be repeated. For instance, when a DOE plan is available, steps from step 1007 can be repeated, and, when a DOE plan and R2R model are available, steps from step 1015 can be repeated.

In step 1021, the user is to determine whether to use a pre-configured run-to-run association. If not, then a run-to-run association is performed using "Save As" for association or through a graphical user interface.

Once a run-to-run association is selected (either in step 1021 or step 1023), the run-to-run model, run-to-run association, and manipulated process recipes may all be activated and run in a stand-alone mode or export mode so that an import can be performed on a module controller 1207 or another APC system. The module controller and APC system are described below in connection with FIG. 12. As noted above, FIG. 11 illustrates the steps of designing a DOE plan. First, in step 1101, the user configures a DOE plan by selecting factors, e.g., factor USL and LSL, and responses.

In step 1103, the user determines whether to enter DOE cases manually. If the user decides to enter the cases manually, then the user makes such entries in step 1105 and skips to step 1119.

In step 1107, the user is allowed to import a DOE plan. If a DOE plan is to be imported, then the names in the import file are checked to ensure that they match names in the DOE plan in step 1122. After such a check, the imported file can be edited in step 1117.

If the user does not import a DOE plan, a candidate model structure is selected from the choices of linear, linear with interaction, quadratic, and quadratic with interaction in step 1109. Then, a method is selected (e.g., factorial or CCD) in step 1111, and a DOE fraction is selected in step 1113.

After the selections have been made DOE cases are generated automatically in step 1115. The generated cases may be edited by the user in steps 1117.

In step 1119, associations are either created or copied for all factors and responses in the DOE plan. The user then selects activated, manipulated process recipes for the DOE. As this point, the control of the steps is reverted back to step 1005 in FIG. 10.

As noted above in connection with FIG. 2, the process controller-DOE 201 is integrated with the process controller-Model Gen. 205. For instance, if the quadratic with interactions model is selected, the corresponding model (e.g., the quadratic with interactions formula) may require a larger set of experiments in order to collect the necessary amount of information in order to create that model. The linear models, either with or without interactions, would require a much fewer set of experiments. Accordingly, depending upon which model is to be selected, the DOE plan is generated with a larger or smaller set of experiments.

Figure 12:
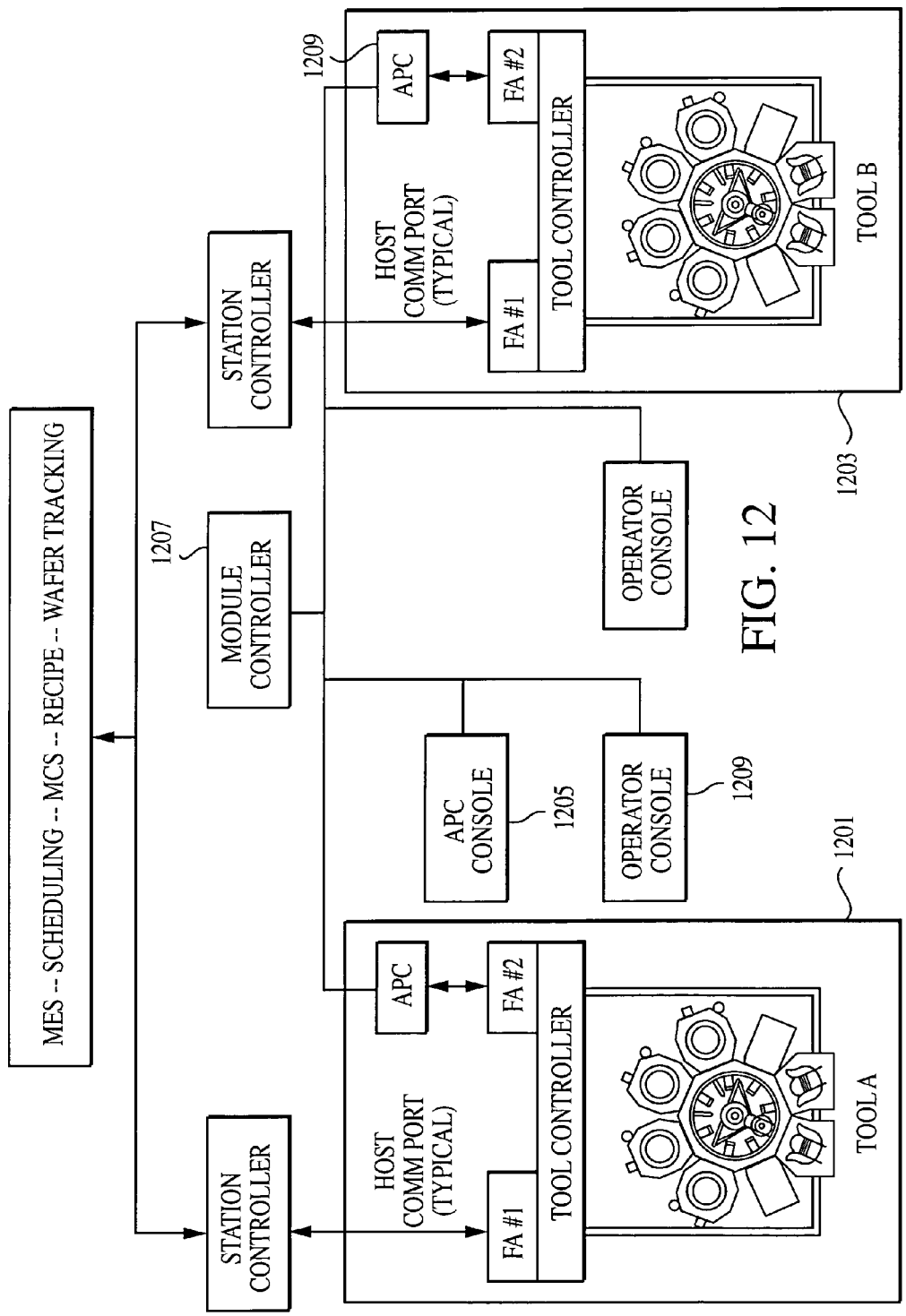
FIG. 12 is a block diagram illustrating communication links among a DOE system and a number of tools according to embodiments of the present invention.

In FIG. 12, an example factory layout of embodiments of the present invention is illustrated. The example layout includes two tools 1201, 1203 connected to an APC (Application Process Control) console 1205, module controller 1207 and one or more operator consoles 1209. The tools are connected to the consoles and controllers via two communication ports, FA #1 and FA #2.

In each tool, the APC 1205 communicates with a specific tool and the APC can be accessed by the APC console 1205 or the operator console 1209 remotely. The APC connects to the tool via the connection tools. With respect to the APC, at least some of its various features are also described in U.S. Patent Publication No. 2003-0049376, matured from U.S. Non-Provisional application Ser. No. 10/174,377, entitled as "FEEDBACK CONTROL OF SUB-ATMOSPHERIC CHEMICAL VAPOR DEPOSITION PROCESSES," filed on Jun. 18, 2002, which is incorporated herein by reference in its entirety.

It should be understood that the various functions, industries, mechanisms, etc. mentioned in the examples above are merely by way of illustration, and that embodiments of the present invention contemplate use in any number of other types and variations of applications.

Figure 13:
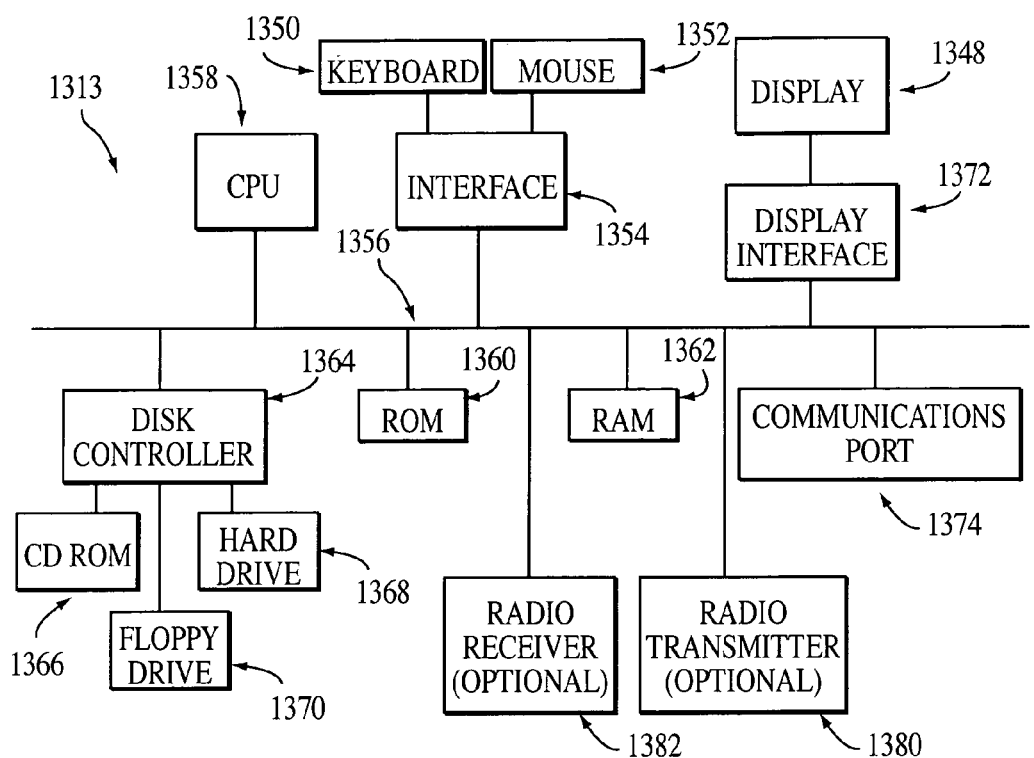
FIG. 13 is a block diagram representation of example embodiments of a computer configured to perform embodiments of the present invention.

An example embodiment of the computer in which at least some embodiments of the present invention operates is described below in connection with FIGS. 13-14. FIG. 13 illustrates a block diagram of one example of the internal hardware 1313 of a computer configured to perform embodiments of the present invention. A bus 1356 serves as the main information highway interconnecting various components therein. CPU 1358 is the central processing unit of the internal hardware 1313, performing calculations and logic operations required to execute embodiments of the present invention as well as other programs. Read only memory (ROM) 1360 and random access memory (RAM) 1362 constitute the main memory. Disk controller 1364 interfaces one or more disk drives to the system bus 1356. These disk drives are, for example, floppy disk drives 1370, or CD ROM or DVD (digital video disks) drives 1366, or internal or external hard drives 1368. These various disk drives and disk controllers are optional devices.

A display interface 1372 interfaces display 1348 and permits information from the bus 1356 to be displayed on display 1348. Communications with external devices, such as the other components of the system described above, occur utilizing, for example, communication port 1374. Optical fibers and/or electrical cables and/or conductors and/or optical communication (e.g., infrared, and the like) and/or wireless communication (e.g., radio frequency (RF), and the like) can be used as the transport medium between the external devices and communication port 1374. Peripheral interface 1354 interfaces the keyboard 1350 and mouse 1352, permitting input data to be transmitted to bus 1356. In addition to these components, the internal hardware 1313 also optionally includes an infrared transmitter and/or infrared receiver. Infrared transmitters are optionally utilized when the computer system is used in conjunction with one or more of the processing components/stations/modules that transmit/receive data via infrared signal transmission. Instead of utilizing an infrared transmitter or infrared receiver, the computer system may also optionally use a low power radio transmitter 1380 and/or a low power radio receiver 1382. The low power radio transmitter transmits the signal for reception by components of the production process, and receives signals from the components via the low power radio receiver. The low power radio transmitter and/or receiver are standard devices in the industry.

Although the computer in FIG. 13 is illustrated having a single processor, a single hard disk drive and a single local memory, the analyzer is optionally suitably equipped with any multitude or combination of processors or storage devices. For example, the computer may be replaced by, or combined with, any suitable processing system operative in accordance with the principles of embodiments of the present invention, including sophisticated calculators, and hand-held, laptop/notebook, mini, mainframe and super computers, as well as processing system network combinations of the same.

Figure 14:
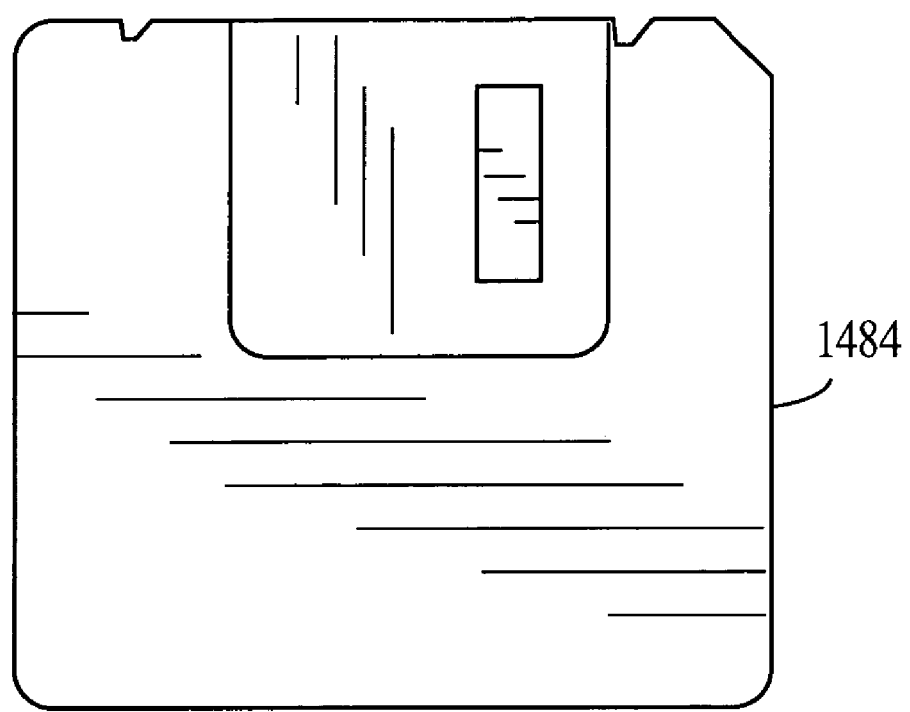
FIG. 14 is a diagram illustrating an example of a memory medium embodiments of the present invention, which may be used for storing computer program embodiments of the present invention.

FIG. 14 is an illustration of an example computer readable memory medium 1484 utilizable for storing computer readable code or instructions. As one example, medium 1484 may be used with disk drives illustrated in FIG. 13. Typically, memory media such as a CD ROM, a digital video disk or a floppy disk will contain, for example, a multi-byte locale for a single byte language and the program information for controlling the modeling environment, the DOE system, the process control, etc. to enable the computer to perform the functions described herein. Alternatively, ROM 1360 and/or RAM 1362 illustrated in FIG. 10 can also be used to store the program information that is used to instruct the central processing unit 1358 to perform the operations associated with various automated processes of the present invention. Other examples of suitable computer readable media for storing information include magnetic, electronic, or optical (including holographic) storage, some combination thereof, etc.

In general, it should be emphasized that the various components of embodiments of the present invention can be implemented in hardware, software or a combination thereof. In such embodiments, the various components and steps would be implemented in hardware and/or software to perform the functions of embodiments of the present invention. Any presently available or future developed computer software language and/or hardware components can be employed in such embodiments of the present invention. For example, at least some of the functionality mentioned above could be implemented using Visual Basic, C, C++, or any assembly language appropriate in view of the processor(s) being used. It could also be written in an interpretive environment such as Java and transported to multiple destinations to various users.

The many features and advantages of embodiments of the present invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of automation performed on a semiconductor manufacturing tool, comprising:
    (a) allowing a user to select one or more recipe parameters for a set of designed experiments;
    (b) allowing a user to specify that the recipe parameters are not a linear function of time,
    (c) automatically running the set of designed experiments on the tool;
    (d) collecting data resulting from running the experiments;
    (e) time-scaling the collected data from running experiments based on recipe parameters specified as not a linear function of time to make the collected data appear as a linear function in a segment of time;
    (f) creating a model based on the time-scaled collected data; and
    (g) using the model to control the tool.

2. The method of claim 1, wherein (d) is performed automatically.

3. The method of claim 1, wherein (f) is performed automatically.

4. The method of claim 1, further including:
automatically creating the set of designed experiments for the tool.

5. The method of claim 1, further including:
importing one or more designed experiments from an external system.

6. The method of claim 1, further including at least one of:
importing data collected by running at least one experiment on an external system; and
importing data collected during at least one previously run experiment.

7. The method of claim 6, further including:
automatically creating a model based on the imported data and user input.

8. The method of claim 6, further including:
automatically creating a model based on the collected data, the imported data and user input.

9. The method of claim 1, further including:
allowing a user to interactively select one or more recipe parameters to be adjusted between the experiments of the designed set of experiments and select one or more set of data to be collected.

10. The method of claim 9, further including:
automatically generating the design set of experiments based on the user selected recipe parameters and set of data to be collected.

11. The method of claim 1, further including:
collecting the data based on a wafer-by-wafer basis.

12. The method of claim 1, wherein the tool is a Chemical-Mechanical-Planarization tool.

13. A method of automation performed on a tool to manufacture devices, comprising:
    (a) automatically creating a set of designed experiments based on one or more recipe parameters;
    (b) allowing a user to specify that the recipe parameters are not a linear function of time;
    (c) automatically running the set of designed experiments on the tool;
    (d) automatically collecting data resulting from running the experiments, wherein the data are collected on a wafer-by-wafer basis;
    (e) time-scaling the collected data from running experiments based on recipe parameters specified as not a linear function of time to make the collected data appear as a linear function in a segment of time;
    (f) automatically creating a model based on the collected data; and
    (g) using the model to control the tool.

14. A method of automation performed on a tool to manufacture devices, comprising:
    (a) automatically running a set of designed experiments based on one or more recipe parameters on the tool;
    (b) automatically collecting data resulting from running the experiments;
    (c) where the recipe parameters are not a linear function of time, time-scaling the collected data to make the collected data appear as a linear function in a segment of time;
    (d) creating a model based on the time-scaled collected data and imported data; and
    (e) using the model to control the tool.

15. The method of claim 14, wherein the imported data are from running at least one experiment on an external system.

16. The method of claim 15, wherein the imported data are from previously run experiments.

17. A computer-implemented system of automating a semiconductor manufacturing tool, comprising:
    (a) a computer;
    (b) a DOE system configured to automatically create a designed set of experiments based on one or more recipe parameters for the tool;
    (c) a controller configured to automatically run the created set of experiments on the tool and collect data resulting from running the experiments; and
    (d) a modeling environment configured to create a model based on the time-scaled collected data, wherein the controller is further configured to control the tool based on the created model, and wherein the DOE system, controller and modeling environment are integrated with each other, wherein the DOE system is further configured to allow a user to specify whether the recipe parameters are not a linear function of time, and to time-scale the collected data to make the collected data appear as a linear function in a segment of time if the recipe parameters are not a linear function of time.

18. The system of claim 17, wherein the DOE system is further configured to import one or more designed experiments from an external system.

19. The system of claim 17, wherein the DOE system is further configured to import at least one of data collected by running at least one experiment on an external system and data collected during at least one previously run experiment.

20. The system of claim 19, wherein the DOE system is further configured to create a model based on the imported data and user input.

21. The system of claim 19, wherein the DOE system is further configured to create a model based on the time-scaled collected data, the imported data, and user input.

22. The system of claim 17, wherein the DOE system is further configured to allow a user to interactively select one or more recipe parameters to be adjusted between the experiments of the designed set of experiments and select one or more set of data to be collected.

23. The system of claim 22, wherein the DOE system is further configured to generate automatically the design set of experiments based on the user selected recipe parameters and set of data to be collected.

24. The system of claim 17, wherein the controller is further configured to collect the data based on a wafer-by-wafer basis.

25. The system of claim 17, wherein said tool is a Chemical-Mechanical-Planarization tool.

26. A computer readable medium for storing instructions being executed by one or more computers, the instructions directing the one or more computers for automatically generating design of experiment (DOE), the instructions comprising implementation of:
 (a) automatically running a set of designed experiments based on one or more recipe parameters on the tool; (b) allowing a user to specify that the recipe parameters are not a linear function of time;
 (c) automatically collecting data resulting from running the experiments; (d) time-scaling the collected data from running experiments based on recipe parameters specified as not a linear function of time to make the collected data appear as a linear function in a segment of time;
 (e) creating a model based on the time-scaled collected data; and
 (f) using the model to control the tool.

27. The medium of claim 26, further including the instructions for implementing:
 automatically creating the set of designed experiments for the tool.

28. The medium of claim 26, further including the instructions for implementing:
 importing one or more designed experiments from an external system.

29. The medium of claim 26, further including the instructions for implementing:
 importing data collected by running at least one experiment on an external system; and
 importing data collected during at least one previously run experiment.

30. The medium of claim 29, further comprising the instructions for implementing:
 automatically creating a model based on the imported data and user input.

31. The medium of claim 29, further including the instructions for implementing:
 automatically creating a model based on user input, the time-scaled collected data and the imported data.

32. The medium of claim 26, further including the instructions for implementing:
 allowing a user to interactively select one or more recipe parameters to be adjusted between the experiments of the designed set of experiments and select one or more set of data to be collected.

33. The medium of claim 32, further including the instructions for implementing:
 automatically generating the design set of experiments based on the user selected recipe parameters and set of data to be collected.

34. The medium of claim 26, further including the instructions for implementing:
 collecting the data based on a wafer-by-wafer basis.

* * * * *